(12) United States Patent  
Nguyen et al.

(10) Patent No.: US 11,059,569 B1  
(45) Date of Patent: Jul. 13, 2021

(54) FLIGHT CONTROL SYSTEM FOR AIRCRAFT HAVING MULTI-FUNCTIONAL FLIGHT CONTROL SURFACE

(71) Applicant: United States of America as Represented by the Administrator of the NASA, Washington, DC (US)

(72) Inventors: Nhan Thanh Nguyen, Santa Clara, CA (US); Kelley Elizabeth Hashemi, San Francisco, CA (US)

(73) Assignee: United States of America as Represented by the Administrator of NASA, Washington, DC (US)

( * ) Notice: Subject to any disclaimer, the term of this patent is extended or adjusted under 35 U.S.C. 154(b) by 123 days.

(21) Appl. No.: 16/231,385

(22) Filed: Dec. 21, 2018

Related U.S. Application Data

(60) Provisional application No. 62/612,127, filed on Dec. 29, 2017.

(51) Int. Cl.
| | |
|---|---|
| *B64C 13/22* | (2006.01) |
| *B64C 9/06* | (2006.01) |
| *B64C 3/38* | (2006.01) |
| *B64C 9/00* | (2006.01) |
| *B64C 13/04* | (2006.01) |
| *B64C 3/14* | (2006.01) |

(52) U.S. Cl.  
CPC ............... *B64C 13/22* (2013.01); *B64C 3/38* (2013.01); *B64C 9/06* (2013.01); *B64C 13/04* (2013.01); *B64C 3/14* (2013.01); *B64C 2003/147* (2013.01); *B64C 2009/005* (2013.01)

(58) Field of Classification Search  
USPC .......................................................... 701/5  
See application file for complete search history.

(56) References Cited

U.S. PATENT DOCUMENTS

| | | | | |
|---|---|---|---|---|
| 5,082,207 | A * | 1/1992 | Tulinius | B64C 3/44 244/76 R |
| 5,908,176 | A * | 6/1999 | Gilyard | G05D 1/0005 244/203 |
| 9,227,721 | B1 * | 1/2016 | Nguyen | B64C 3/14 |
| 2002/0065636 | A1 * | 5/2002 | Yamaguchi | G06F 30/00 703/2 |
| 2011/0084174 | A1 * | 4/2011 | Hemmelgarn | B64C 3/48 244/200 |

(Continued)

*Primary Examiner* — Tyler D Paige  
(74) *Attorney, Agent, or Firm* — Rhys W. Cheung; Robert M. Padilla; Helen M. Gaius

(57) ABSTRACT

A flight control system for an aircraft having a multi-functional flight control surface. The aircraft has at least one multi-functional flight control surface formed by a sequence of flaps. The shape of each multi-functional flight control surface may be configured by a flight control to simultaneously adjust a trajectory of the aircraft in two or more of a pitch direction, a roll direction, and a yaw direction. The flight control for operating said the multi-functional flight control surface responds to both pilot commands and machine-generated commands. The machine-generated commands configure the shape of the surface of each multi-functional flight control surface in real-time based, at least in part, upon a set of flight objectives comprising: (a) minimizing drag of the aircraft, (b) aeroelastic modal suppression for the aircraft, and (c) maneuver load alleviation in the aircraft.

18 Claims, 19 Drawing Sheets

(56) References Cited

U.S. PATENT DOCUMENTS

| | | | | |
|---|---|---|---|---|
| 2014/0145027 A1* | 5/2014 | Pogosyan | ................ | B64D 7/00 244/55 |
| 2015/0083853 A1* | 3/2015 | Moser | ....................... | B64C 9/16 244/99.3 |
| 2018/0043985 A1* | 2/2018 | Thompson | ............ | B64C 23/072 |

* cited by examiner

FLIGHT CONTROL SYSTEM FOR AIRCRAFT HAVING MULTI-FUNCTIONAL FLIGHT CONTROL SURFACE

CLAIM OF PRIORITY

This application claims priority to previously filed U.S. Provisional Patent Application No. 62/612,127, filed on Dec. 29, 2017, entitled "Multi-Objective Flight Control Method for Drag Optimization, Load Alleviation Control, and Modal Suppression for Flexible Aircraft," invented by Nhan Nguyen and Kelley Hashemi, the disclosure of which is hereby incorporated by reference for all purposes as if fully set forth herein.

ORIGIN OF THE INVENTION

The invention described herein was made in the performance of work under a NASA contract and by (an) employee(s) of the United States Government and is subject to the provisions 51 U.S.C. § 20135(b), Public Law 111-314, § 3 (124 Stat. 3330, 51 U.S.C. Chapter 201), and may be manufactured and used by or for the Government for governmental purposes without the payment of any royalties thereon or therefore.

FIELD OF THE INVENTION

Embodiments of the invention generally relate to the field of aeronautics, and more particularly, to a flight control for an aircraft having a multi-functional distributed flight control surface.

BACKGROUND

Aircraft are designed to be aerodynamic and possess sufficient structural integrity to accommodate their anticipated loads. Modern engineered materials, such as composites, have begun to be used in aircraft construction due to their strength and lighter weight. Such materials are also more flexible than prior aircraft construction materials. For example, a typical modern transport aircraft wing can support the same load-carrying capacity as an older aluminum wing while nevertheless being less structurally rigid. As a result, next-generation aircraft designs are likely to be developed that take advantage of the structural flexibility afforded by modern engineered materials to improve aerodynamic performance.

As aircraft wings become more flexible, adverse aerodynamic conditions may result from changes in wing shapes due to aeroelastic deflections. A flexible wing naturally deforms during flight due to the forces it endures. Among other issues, deformations of the wing can increase drag, which in turn, increases the rate of fuel consumption.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Figure 1:
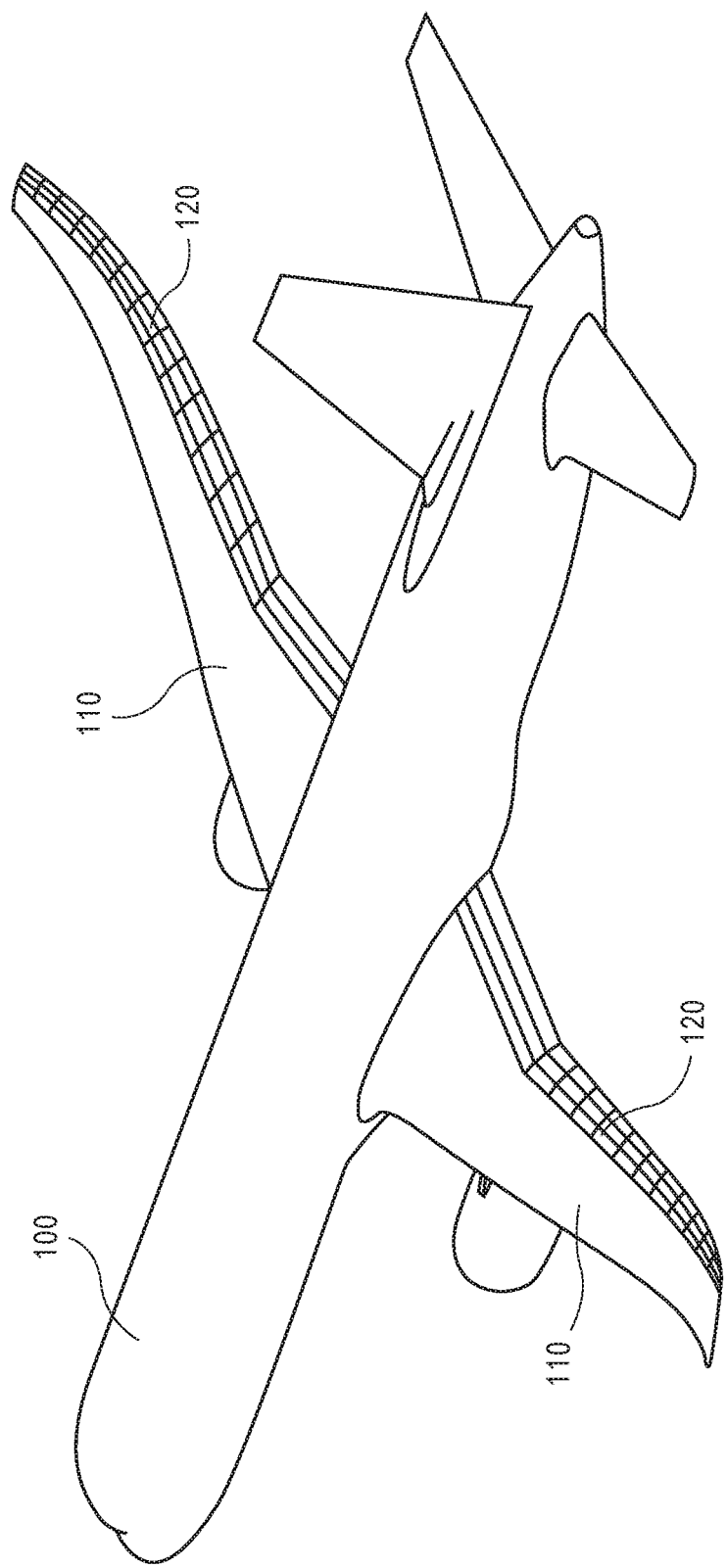
FIG. 1 is an illustration of an aircraft having a multi-functional flight control surface according to an embodiment of the invention.

Approaches for an aircraft having one or more flight surfaces that automatically respond to dynamic conditions are presented herein. In the following description, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

Functional Overview Aircraft flight control systems are designed to perform specific objectives that are specified by pilots during flight operations. In many aircraft conventional flight control systems, flight control tasks are usually decomposed into subsets of flight control tasks associated with each of the three aircraft axes, i.e., roll, pitch, and yaw. To perform flight control tasks in each of these axes, appropriate flight control surfaces are available such as the aileron or spoiler for roll control, the elevator for pitch control, and the rudder for yaw control. This prior art decomposition has been a fixture in many conventional flight control systems. Owing to the prior art association of the use of each particular flight control surface for each flight control task in each of the three axes, a typical prior art flight control system design tends to address one predominant or specific flight control objective. For example, to pitch the aircraft up or down, the pilot applies a stick command which issues a signal to a prior art flight control system to perform a feedback control action using the elevator to track the pilot's stick input. This prior art flight control design is a single-objective design with the sole purpose of tracking the pilot's stick input command to pitch the aircraft. Implicit in this prior art single-objective flight control design for tracking a pilot command is the stability augmentation feedback control system to increase aircraft stability that usually exists in the majority if not all flight control systems.

Some conventional aircraft such as those military aircraft are also equipped with multiple flight control surfaces, but such flight control surfaces are designed to perform prior art single objective flight control tasks by the standard method of control allocation which takes in a specific flight control objective metric, such as the required pitching moment of the aircraft and compute the deflections of the multiple flight control surfaces by a standard optimization technique to achieve this flight control objective.

Aircraft are designed to be aerodynamically efficient and possess sufficient structural integrity to accommodate their anticipated loads. Modern engineered materials, such as composites, have begun to be used in aircraft construction due to their higher strength and lighter weight. The use of light-weight material for weight savings contributes to the reduced trim drag of an aircraft which leads to increased fuel efficiency. Another trend in the modern aircraft design is the use of higher aspect ratio wings. Roughly speaking, a wing aspect ratio is defined to be the ratio of the wing length or span to the average wing width or chord. In a typical aircraft design, the designer has more flexibility in changing the wing span than changing the wing average chord which is normally constrained to meet the internal wing structural and mechanical equipage. By increasing the wing span, the wing aspect ratio increases and this in turn results in a decrease in the lift-induced drag of the aircraft. Hence, both the structural design and aerodynamic design of modern aircraft can contribute to the overall improvement in the fuel efficiency.

When light-weight materials such as composites are used in high aspect ratio wing constructions, such constructions tend to be more flexible than prior aircraft constructions and can support the same load-carrying capacity as an older aluminum wing construction while nevertheless being less structurally rigid. As a result, next-generation aircraft designs are likely to be developed that could take advantage of the structural flexibility afforded by modern engineered materials to improve aerodynamic performance. Active wing shaping control is a modern flight control design philosophy that could enable next-generation aircraft to take advantage of the structural flexibility to improve aerodynamic performance and fuel efficiency. This design philosophy proposes the use of a multi-functional distributed flight control surface design that employs multiple distributed flight control surfaces on a wing that can be actively deployed in-flight to change a wing shape to improve aerodynamic efficiency throughout the flight envelope.

These distributed flight control surfaces may also be designed to perform other flight control objectives to enable safe operation of modern aircraft that employ high aspect ratio wing constructions using light-weight materials. One such flight control objective is to increase the structural stability margin of a wing structure. Aircraft wings must be designed to meet stringent certification requirements on flutter clearance. Roughly speaking, flutter is an aerodynamically induced structural stability problem which manifests in structural vibration of a wing structure as the aircraft flight speed increases close to a critical speed called flutter speed. The flight speed boundary at which a wing structure begins to flutter is called a flutter boundary. Operations inside or below the flutter boundary result in safe flutter-free operations. As a wing structure becomes more flexible, the propensity for flutter also increases at a lower critical flutter speed. Thus, active flutter suppression or aeroservoelastic mode suppression control is a flight control objective that enables a modern high aspect ratio wing design to meet flutter clearance requirements by providing active damping to the wing structure to suppress flutter or aeroelastic mode response.

A subtle difference between active flutter suppression and aeroservoelastic mode suppression should be noted. Active flutter suppression is a control design that actively suppresses flutter at a given flight speed during operation of an aircraft. Currently, no aircraft has been certified for operation outside a flutter boundary with active flutter suppression due to safety reasons. On the other hand, aeroservoelastic mode suppression is a control design that actively suppresses the structural vibration of a wing structure as an aircraft operates close to a flutter boundary even though the flight speed has not reached the flutter speed. Other than the subtle difference, the implementation of a flutter suppression and aeroservoelastic mode suppression could be equivalent.

Another flight control objective for safe operation of modern aircraft that employ high aspect ratio wing constructions using light-weight materials is the reduction of structural loads on a wing structure. The structural loads can be due to a specific aircraft maneuver or an atmospheric gust encounter. During a maneuver such as a roll maneuver or an emergency pull-up maneuver, the wing lift increases to meet the force requirement during the maneuver. This increased wing lift is accompanied by a concomitant increase in the wing structural loads. During a gust encounter, the turbulence in the atmosphere creates a turbulent velocity that changes the air flow over a wing which in turn causes an increase in the wing lift, hence wing structural loads. A structural load increase can cause structural integrity issues such as overstress or high-cycle fatigue that generally are to be avoided.

With a multi-functional distributed flight control surface design, structural loads can be actively alleviated. Maneuver load alleviation control objective can be considered to provide a capability in a flight control system design to reduce the wing structural loads during a maneuver. Gust load alleviation control objective is a capability that aims at reducing the wing structural loads during a gust encounter. Together, both control objectives could be combined into a single gust load alleviation objective since the maneuver load alleviation objective could be considered as a subset of the gust load alleviation objective. The implementation of a gust load alleviation control depends on whether or not the gust input is present.

Other flight control objectives also could be considered to provide the passenger comfort for passengers who travel in modern aircraft that employs high aspect ratio wing constructions using light-weight materials. One such flight control objective is to improve the ride qualities which are a measure of the passenger comfort. As a wing structure becomes more flexible, hence more responsive to atmospheric turbulence, the structural vibration of the wing could be felt by the passengers and can cause discomfort. This structural vibration is coupled to the aircraft fuselage whose motion is experienced by a temporal variation in the level of the acceleration. Thus, suppressing the acceleration of the fuselage motion in the presence of the wing structural vibration could be designed by means of active control to improve the ride qualities.

Yet another flight control objective which could be considered is the improvement of pilot handling qualities which are a measure of the pilot's feel about a flight control system through his/her interaction with a flight control input device, such as a yoke or a stick, much like a driver feels about the steering of a car. When a steering wheel feels too light, the tendency to over-correct often occurs. The converse is true with a heavy steering wheel. The motion of the aircraft fuselage when coupled to the wing can affect the pilot's feel and can cause the pilot to over-steer or under-steer an aircraft when the structural vibration of the wing occurs. In addition, the coupling of the fuselage and the wing structure can cause undesirable changes in the natural modes of the aircraft. These natural modes are the result of the energy exchange between the inertial force and the spring force of a mechanical system such as an aircraft. The typical aircraft natural modes are short-period mode, phugoid mode, dutch-roll mode, roll subsidence mode, and spiral mode. Due to the coupling with the wing structure, the natural modes of the aircraft could exhibit undesirable characteristics typically defined by the natural frequencies and damping ratios of these natural modes. These characteristics can affect the pilot's interaction with an aircraft flight control system. Active controls can be implemented to bring about desirable characteristics of the natural modes, hence improved handling qualities.

A previous approach is to switch from one control objective to another control objective depending on a given flight operation. For example, consider two control objectives: one to command a roll maneuver and the other to suppress gust responses. If the aircraft is equipped with the conventional aileron for roll control, then gust load alleviation control objective cannot be simultaneously met since the two aileron surfaces are also most effective in suppressing the gust responses by compensating the wing lift.

Thus, embodiments of the invention overcome disadvantages of the prior approach by having a fully integrated flight control system that synthesizes multiple control objectives in a synergistic manner to achieve these objectives simultaneously. Embodiments of the invention further overcome another disadvantage of the prior approach by use of a smooth automatic transition from one control objective to another. For example, previously, the roll control objective is switched to the gust load alleviation objective once the roll maneuver is complete. Therefore, present embodiments advantageously synthesize a flight control system in the presence of multiple control objectives. In present embodiments, a flight control system should be able to achieve multiple control objectives simultaneously by leveraging a multi-functional distributed flight control surface design, and the transition between the control objectives should occur smoothly and automatically. Furthermore, the desired flight control system should have a characteristic of ease of implementation without the need for executing the multiple control objectives through an iterative process without analytical closed-form solutions. Finally, the desired flight control system should have characteristics that can provide functionalities to address simultaneously multiple control objectives which include at least drag optimization and gust load alleviation for modern aircraft that employ high aspect ratio wing constructions using light-weight materials.

Embodiments of the invention are directed towards a computerized flight control system for operating next-generation aircraft wings with multi-functional distributed flight surfaces or current generation aircraft wings with flight control surfaces that can be retrofitted to have multi-functional capabilities.

Advantageously, the flight control of an embodiment may control the operation of multi-functional distributed flight control surfaces to simultaneously pursue and achieve multiple flight objectives, including but not limited to: (1) drag or fuel consumption minimization, (2) maneuver and gust load alleviation, and (3) aeroservoelastic (ASE) mode suppression, while being responsive to pilot input commands from an input device such as a yoke or a stick, and may implement an instruction from a pilot in a manner that is best promotes flight objectives based on the present operational conditions of the aircraft as indicated by appropriate sensors and flight data. However, the operation of the multi-functional distributed flight control surface may also be dynamically adjusted by the flight control of an embodiment in the absence of pilot instructions to best achieve those multiple flight objectives given the present operational conditions of the aircraft as indicated by appropriate sensors and flight data.

The consideration of multiple flight objectives while controlling the operation of a plurality of flight surfaces on a wing of an aircraft is quite different than prior approaches. Previously, flight control objectives are typically handled separately. A conventional flight control design employs a single-axis flight control philosophy, i.e., pitch control is conducted using the elevator, roll control is conducted using the aileron, and yaw control is conducted using the rudder. Prior designs typically use one or two conventional flight control surfaces to achieve any single flight control objective. Embodiments of the invention improve upon previous flight control systems because drag optimization and the aeroservoelasticity of the aircraft itself are also not considered and are a substantial factor in the movement of flight control surfaces.

In contrast to prior approaches, a flight control of an embodiment controls the multi-functional flight control surface in accordance with multiple flight objectives all acting in a synergistic manner. The multiple flight objectives which may be pursued by a flight control of an embodiment include without limitation: 1) traditional pilot commands, 2) drag minimization, 3) aeroelastic mode suppression, 4) gust load alleviation, and 5) maneuver load alleviation. Each of these flight objectives can be supported or implemented by its own control system design or module. Thus, a multi-objective flight control system can be a complex flight control system that considers multiple competing requirements to achieve optimal flight control solutions that possess the best compromise for these requirements. In addition, a real-time drag minimization control strategy and aeroservoelasticity of the aircraft are included in the guidance loop of a flight control according to some embodiments.

These and other features of embodiments will be described in greater detail below after the following description of the multi-functional flight control surface of an embodiment.

Multi-Functional Flight Control Surface System

FIG. 1 is an illustration of an aircraft wing 100 having an aircraft wing 110 equipped with a multi-functional flight control surface system 120 according to an embodiment of the invention. Aircraft wing 110 depicted in FIG. 1 is a flexible wing that could be elastically deformed in-flight by the forces placed thereon.

Figure 2:
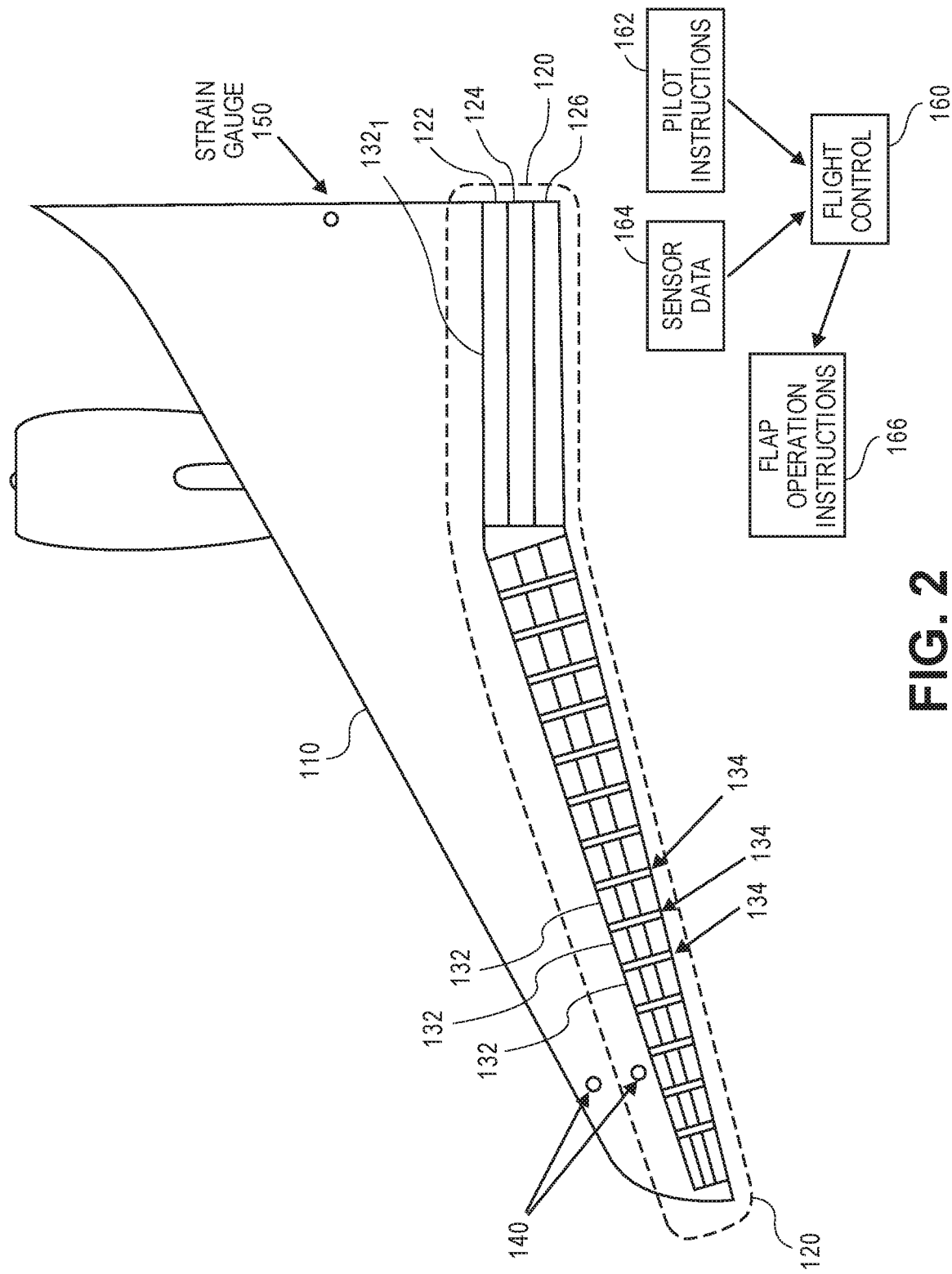
FIG. 2 is an illustration of an aircraft wing and the data collected from and sent thereto by an embodiment of the invention.

FIG. 2 is an illustration of an aircraft wing 110 and the data collected from and sent thereto by an embodiment of the invention. Multi-functional flight control surface system 120 of aircraft wing 110 may be shaped or positioned in-flight by multi-objective flight control system 160 of an embodiment. As depicted in FIG. 2, multi-objective flight control system 160 receives pilot commands 162 and input from systems responsible for various flight control objectives and transmits operational instructions 166 to multi-functional flight control surface system 120 of aircraft wing 110. Pilot commands 162 include input received from cockpit flight controls, such as from a control yoke, center stick, rudder pedals, and throttle controls. In some embodiments, pilot commands 162 comprise electronic signals converted from movements detected from one of the cockpit flight controls in a fly-by-wire system.

Multi-objective flight control system 160 may be implemented by a combination of hardware and software. Physical hardware that may be used to implement multi-objective flight control system 160 is described in greater detail below with reference to FIG. 19; while the functionality of the software used to implement multi-objective flight control system 160 shall be explained in greater detail below with reference to FIG. 8.

In some embodiments, multi-functional flight control surface system 120 of FIG. 2 may be implemented or enabled by Variable Camber Continuous Trailing Edge Flap (VCCTEF) technology, which was developed by NASA Ames Research Center. In some embodiments, multi-functional flight control surface system 120 of FIG. 2 comprises a sequence of flaps 132 interspersed between a sequence of transition sections 134.

Multi-objective flight control system 160 may individually configure each of flaps 132, which imparts loads onto aircraft wing 110 to be tailored dynamically as determined by multi-objective flight control system 160. The spanwise load tailoring performed in this manner allows for optimal lift distribution to be achieved throughout a given flight envelope.

Note that each flap 134 shown in FIG. 2 is depicted as being comprised of three chordwise cambered flap segments that can be individually commanded by multi-objective flight control system 160 of an embodiment. Although, for example, FIG. 2 shows that flap 132 is composed of segments 122, 124, and 126, more or fewer flaps may be used without departing from the spirit of the invention.

Figure 3:
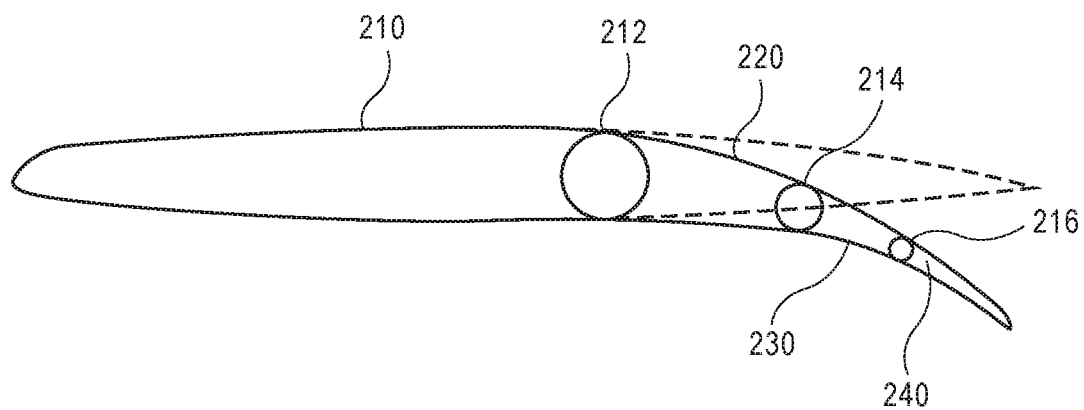
FIG. 3 is an illustration of a three-segment variable chamber flap of a multi-functional flight control surface of an aircraft according to an embodiment of the invention.

To appreciate these flap segments in greater detail, consider FIG. 3, which is an illustration of a three-segment variable chamber flap of a multi-functional flight control surface system 120 of an aircraft wing 110 which may be used by an embodiment of the invention. The three chordwise flap segments 220, 230, and 240 can be individually commanded or actuated in unison when a flap deflection command is given. By varying the deflections of the individual chordwise flap segments 220, 230, and 240 around actuators 212, 214, and 216, any camber surface can be created to achieve a desired aerodynamic performance. The chordwise pressure shaping modifies the pressure distribution on a wing surface to achieve a drag reduction or to reduce the shock formation on the wing's upper surface 210, thus allowing a higher cruise speed or reducing the transonic drag rise.

Figure 4:
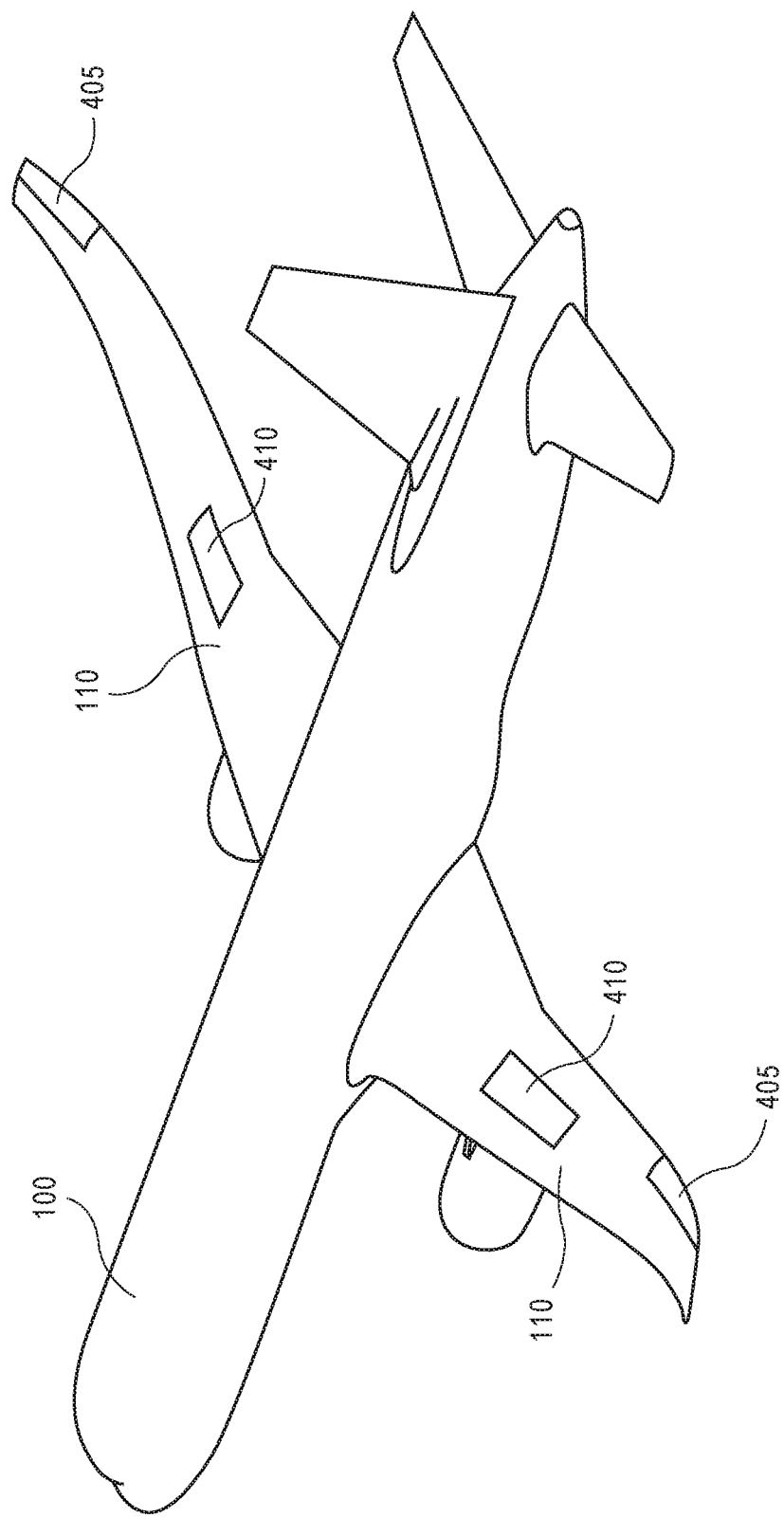
FIG. 4 is an illustration of an aircraft wing having a multi-functional flight control surface system according to an alternative embodiment of the invention.

It should be understood that multi-functional flight control surface system 120 could be of other embodiments and can comprise at least four or more flight control surfaces strategically placed on aircraft wing 110 to provide multi-functional capabilities. For example, FIG. 4 is an illustration of an aircraft wing 110 having a multi-functional flight control surface system 120 according to an alternative embodiment. Multi-functional flight control surface system 120 of FIG. 4 comprises two wing flaps 405 and two spoiler flaps 410. Wing flaps 405 are designed to receive flap deflection commands from multi-objective flight control system 160 to impart necessary loads onto aircraft wing 110 to aeroelastically change the wing twist so as to reduce aerodynamic drag or to compensate for gust loads imposed on aircraft wing 110. In another function, wing flaps 405 can also receive flap deflection commands from multi-objective flight control system 160 to maintain wing-level control objective through a feedback control action. Spoiler flaps 410 are designed to receive individual flap deflection commands from multi-objective flight control system 160 to impart asymmetric loads onto aircraft wing 110 to enable aircraft 100 to perform a roll maneuver.

Figure 5:
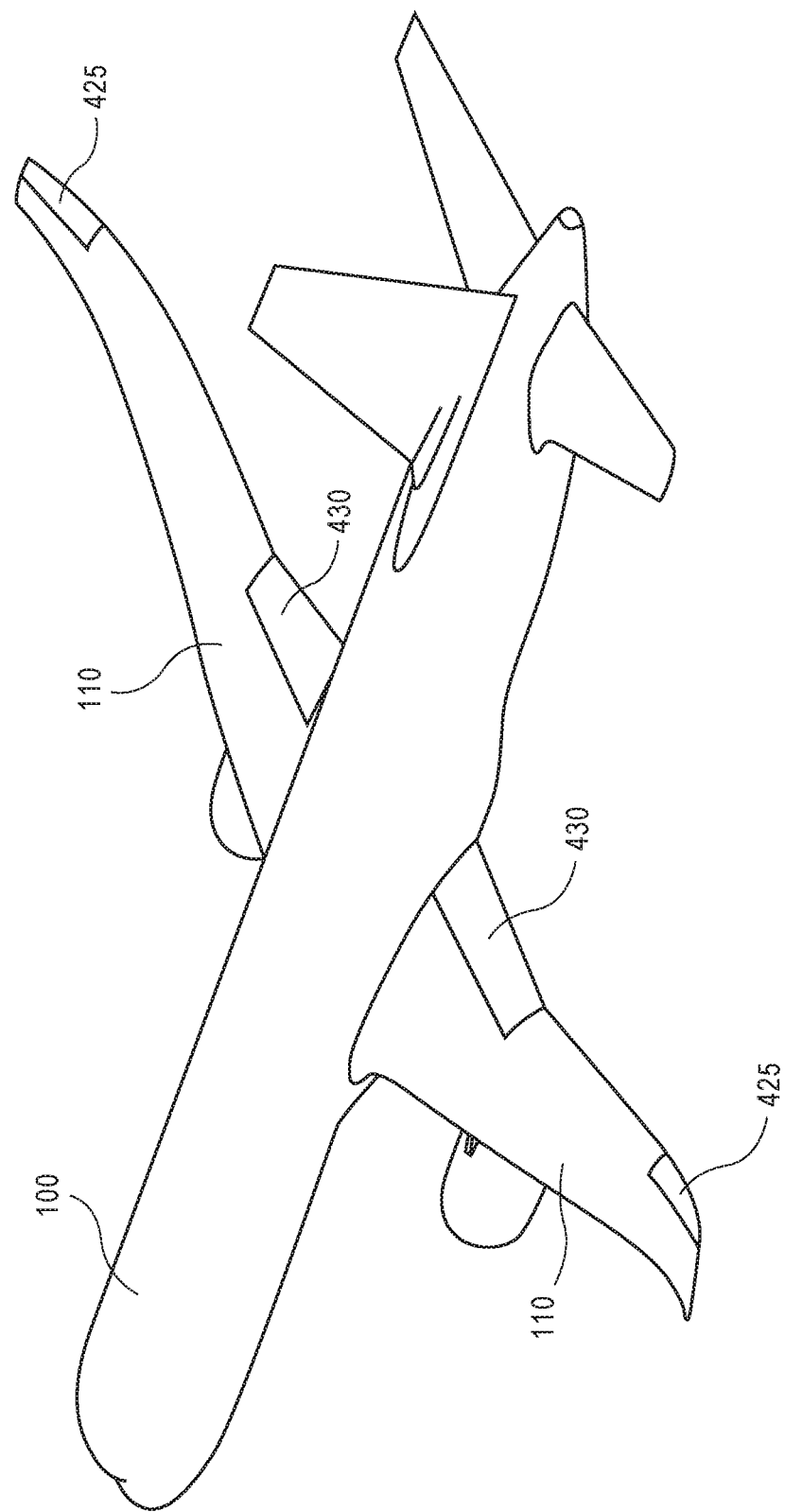
FIG. 5 is an illustration of an aircraft wing having a multi-functional flight control surface system according to an alternative embodiment of the invention.

FIG. 5 is an illustration of an aircraft wing 110 having a multi-functional flight control surface system 120 according to another alternative embodiment. Multi-functional flight control surface system of FIG. 5 comprises two wing flaps 425 and two high-lift flaps 430. Wing flaps 425 are designed to receive flap deflection commands from multi-objective flight control system 160 to achieve roll control objective, gust load alleviation objective, and wing-level control objective. High-lift flaps 430 receive and perform flap deflection commands from multi-objective flight control system 160 in accordance with the drag optimization objective.

Wing and Aircraft Sensors

Figure 6:
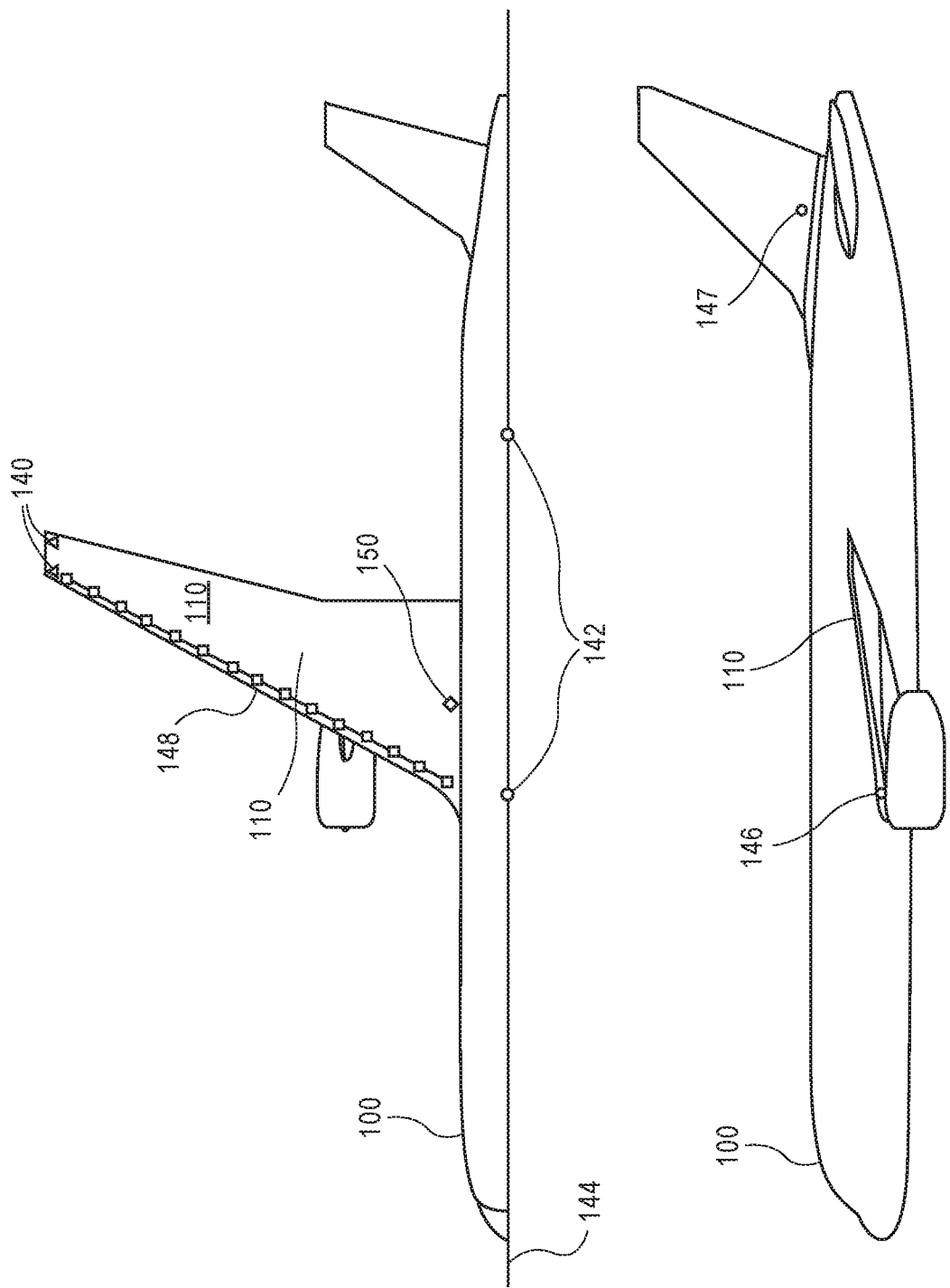
FIG. 6 is an illustration of an aircraft having sensors from which sensor data may be collected in accordance with an embodiment of the invention.

Aircraft 100 and aircraft wing 110 may employ a number of different sensors and gauges which supply sensor data 164 to multiple-objective flight control system 160. Sensor data 164, as broadly used herein, refers to real-time, operational data that is observed or collected from aircraft wing 110 during flight operation. Sensor data 164 may include data measured by one or more accelerometers 140, which may be disposed over various locations of aircraft wing 110 to measure its movement during flight, as shown in FIG. 6. FIG. 6 is an illustration of an aircraft having sensors from which sensor data may be collected in accordance with an embodiment of the invention. An accelerometer 140 may measure how much the tip of an aircraft wing is deflecting in a particular direction during flight. Embodiments of the invention may employ any number of accelerometers 140 disposed over a variety of different locations of aircraft wing 110.

Accelerometers 140 may also be disposed over various locations of aircraft 100 to measure the motion of aircraft 100 during flight and to provide sensor data 164 to multi-objective flight control system 160 for gust estimation and aerodynamic force estimation of lift and drag. FIG. 6 also depicts at least two normal accelerometers 142 disposed along fuselage center line 144 in a forward and aft locations for the purpose of estimating the normal acceleration and pitch acceleration of aircraft 100 which can be used for gust estimation according to an embodiment of the invention. Normal accelerometers 142 are designed to measure the acceleration component perpendicular to fuselage center line 144. Axial accelerometers 146 may also be disposed at locations either below or above normal accelerometers 142 for the purpose of estimating the axial acceleration of aircraft 100 which can be used for drag estimation. A lateral accelerometer 147 may also be disposed at a location on the vertical tail of aircraft 100 for the purpose of gust estimation according to the present invention, as illustrated in FIG. 6.

As another example, sensor data 164 may also include measurements taken by strain gauge 150, which measures an amount of strain presently being placed upon the aircraft at a particular location. As with accelerometers, any number of strain gauges 150 deployed at various locations on aircraft wing 110 as shown in FIG. 6 may be used by embodiments to provide measurements of structural loads experienced by aircraft wing 110 for the load alleviation objective.

Sensor data 164 may also include measurements taken by turbulence sensors, which measure an amount of turbulence presently being experienced by aircraft 100 at a particular location. As with accelerometers and strain gauges, embodiments of the invention may use turbulence sensors deployed at various locations of aircraft 100.

Furthermore, sensor data 164 may also include pressure measurements taken by pressure sensors 148 disposed over a variety of different locations of aircraft wing 110. FIG. 6 illustrates a series of pressure sensors 148 disposed near the leading edge of aircraft wing 110 along several locations along the wing span in accordance with an embodiment of the invention. When aircraft 100 encounters an atmospheric turbulence or gust, changes in the air flow over aircraft wing 110 are registered as changes in pressure readings on the surface of aircraft wing 110. These pressure readings can be processed by multi-objective flight control system 160 for gust estimation according to an embodiment.

Figure 7:
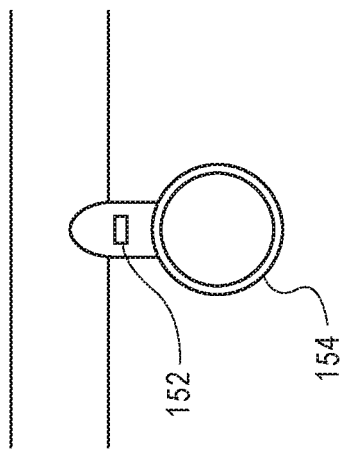
FIG. 7 is an illustration of a load sensor disposed on an aircraft engine for the purpose of estimating engine thrust force which can be used for drag estimation in accordance with an embodiment of the invention.
Figure 7:
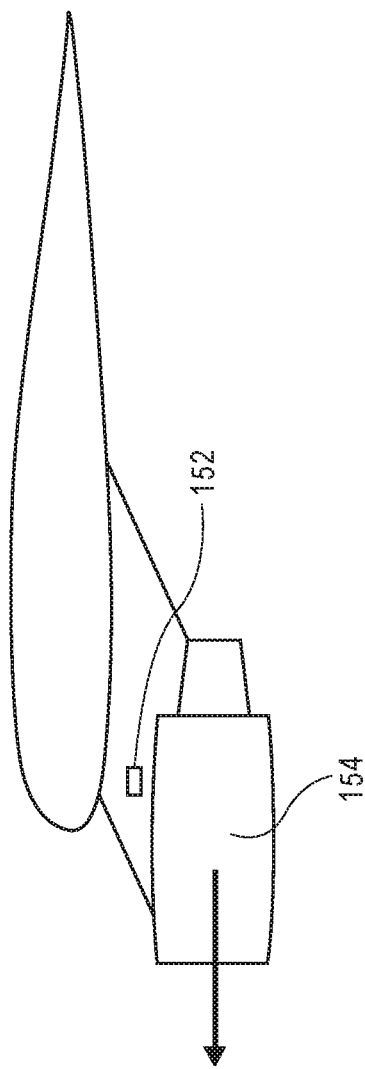

Sensor data 164 may also include engine performance measurements for the purpose of drag estimation. FIG. 7 is an illustration of load sensor 152 disposed on aircraft engine 154 for the purpose of estimating engine thrust force which can be used for drag estimation in accordance with an embodiment of the invention.

Sensor data 164 may also include all available flight data in aircraft 100 to provide various aircraft performance parameters and states such as flight speed, angle of attack, pitch rate, and the like. In addition, sensor data 164 may also include all relevant engine performance parameters such as fuel flow and engine shaft speeds which could be used to estimate thrust and fuel consumption.

Multi-objective flight control system 160 of an embodiment may also receive sensor data 164 from other types of sensors and gauges deployed on aircraft wing 110 other than accelerometer 140 and strain gauge 150. Non-limiting, illustrative examples of such data include data collected from altitude sensors, gyroscopic sensors, and the like.

Multi-Objective Flight Control System

Figure 8:
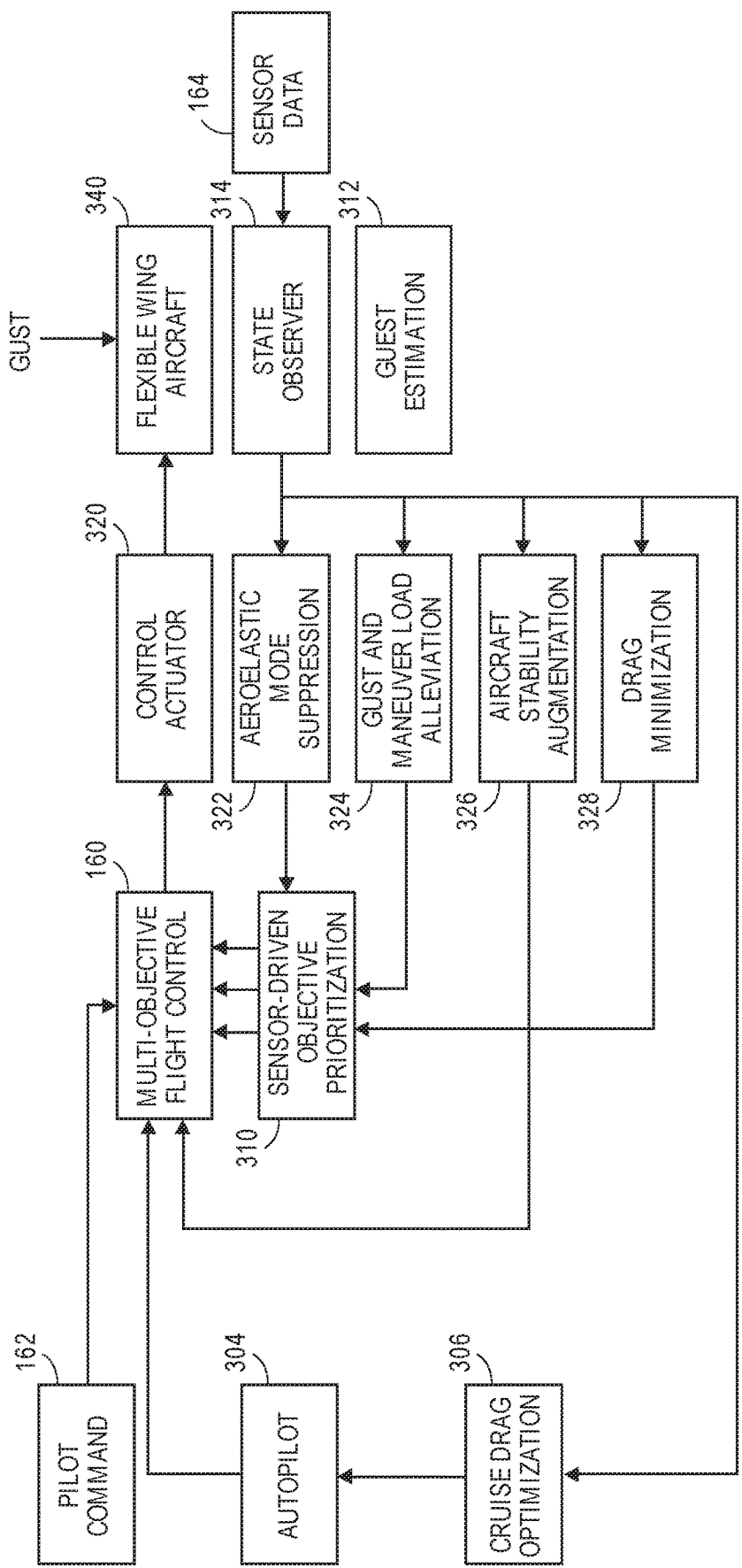
FIG. 8 is a flowchart illustrating the flow of data and operation of a multi-objective flight control according to an embodiment of the invention.

FIG. 8 is a flowchart illustrating the flow of data and operation of multi-objective flight control system 160 according to an embodiment of the invention. According to some embodiments, multi-objective flight control system 160 leverages the capabilities of flight control surfaces, such as multi-functional flight control surface system 120, via the generation of flap operation instructions 166 which pursue multiple flight control objectives simultaneously. Multi-objective flight control system 160 considers aerodynamic performance of aircraft 100 and aeroelasticity of aircraft wing 110 in the process of controlling the operation of aircraft 100. Either when responding to pilot commands 162 or in absence of pilot commands 162, multi-objective flight control system 160 may actively control the wing twist and vertical deflection of aircraft wing 110 to optimize the local angles of attack to improve the aerodynamic efficiency, to reduce structural load responses, or to increase structural stability margin of aircraft wing 110 in conjunction with tracking pilot commands 162, if present.

Consider a cost function that incorporates multiple flight control objectives described by the following equation:

$$J = J_r + \sum_{i=1}^{N} J_i \tag{1}$$

where $J_r$ is the conventional single-objective cost function for tracking pilot commands 162 and $J_i$, i=1, 2, ..., N are cost functions that specify additional flight control objectives that multi-objective flight control system 160 processes to produce flap operation instructions 166 that meet multiple flight control objectives simultaneously.

The cost function $J_r$ can be described by:

$$J_r = \lim_{t_f \to \infty} \frac{1}{2} \int_0^{t_f} [(F_r x_r - G_r r)^\top Q_r (F_r x_r - G_r r) + u_r^\top R_r u_r] dt \tag{2}$$

where $x_r$ denotes the state information of aircraft 100 which may be estimated or measured from sensor data 164, $u_r$ is a subset of flap operation instructions 166 that are responsible for tracking pilot commands 162 and stability augmentation objective 326, $F_r$ is a linear mapping matrix that translates the aircraft state information $x_r$ into an appropriate tracking state to be tracked, $G_r$ is a linear mapping matrix that filters pilot commands 162 into a suitable command for the tracking state via a command shaping filter employed by multi-objective flight control system 160, and $Q_r$ and $R_r$ are referred to as a state weighting matrix and a control weighting matrix, respectively, that can be selected during the design of multi-objective flight control system 160. In some embodiments, the cost function $J_r$ can be optimized to produce the subset of flap operation instructions 166 for $u_r$, by a standard optimal control technique which includes solving a matrix equation known as the Ricatti equation.

The additional cost function $J_i$ can include a cost function for aeroelastic mode suppression of aircraft wing 110 which can be described by:

$$J_1 = J_e = \lim_{t_f \to \infty} \frac{1}{2} \int_0^{t_f} (x_e^\top Q_e x_e + u_e^\top R_e u_e) dt \tag{3}$$

where $x_e$ denotes the state information of aircraft wing 110 which may be estimated or measured from sensor data 164, $u_e$ is a complementary set of flap operation instructions 166 that are responsible for aeroelastic mode suppression objective 322, and $Q_e$ and $R_e$ are a state weighting matrix and a control weighting matrix, respectively, that can be selected during the design of multi-objective flight control system 160 in an embodiment or specified as a function of the state information of aircraft wing 110 using sensor-driven objective prioritization technique 310 according to an embodiment of the present invention. Details of sensor-driven prioritization technique 310 will be described subsequently. In some embodiments, the cost function $J_e$ can be optimized to produce the complementary set of flap operation instructions 166 for $u_e$ by a standard optimal control technique or modified optimal control technique according to the present invention to implement sensor-driven objective prioritization technique 310.

The additional cost function $J_i$ can also include a cost function for drag minimization of aircraft 100 which can be described by $$J_2 = J_D = \lim_{t_f \to \infty} \frac{1}{2} \int_0^{t_f} (q_D \Delta C_D + u^\top R u) dt \quad (4)$$

where $\Delta C_D$ denotes the incremental drag coefficient of aircraft 100 relative to the trim drag, p is a drag weighting coefficient that can be selected during the design of multi-objective flight control system 160 in an embodiment or specified as a function of the state information of aircraft 100 and aircraft wing 110 using sensor-driven objective prioritization technique 310, u is the collection of flap operation instructions 166 that comprises $u_r$ and $u_e$ which are responsible for drag minimization objective 328, and R is a control weighting matrix that can be selected during the design of multi-objective flight control system 160. In some embodiments, the cost function $J_D$ can be optimized to produce flap operation instructions 166 by a modified optimal control technique which includes solving a modified Ricatti equation according to an embodiment of the present invention. This modified optimal control technique will be described in additional detail in the subsequent description.

The additional cost function $J_i$ can also include a cost function for maneuver and gust load alleviation of aircraft 100 which can be described by $$J_3 = J_M = \lim_{t_f \to \infty} \frac{1}{2} \int_0^{t_f} (q_M M^\top M + u^\top R u) dt \quad (5)$$

where M denotes the structural load of aircraft wing 110, $q_M$ is a structural weighting coefficient that can be selected during the design of multi-objective flight control system 160 in an embodiment or specified as a function of the state information of aircraft 100 and aircraft wing 110 using sensor-driven objective prioritization technique 310, u is the collection of flap operation instructions 166 that comprises $u_r$ and $u_e$ which are responsible for load alleviation objective 324, and R is a control weighting matrix that can be selected during the design of multi-objective flight control system 160. In some embodiments, the cost function $J_M$ can be optimized to produce flap operation instructions 166 by a modified optimal control technique which includes solving a modified Ricatti equation according to the present invention. This modified optimal control technique will be described in additional detail below.

Other additional cost functions $J_i$ can also be considered. For example, a cost function $J_4$ could be included in multi-objective flight control system 160 to provide a flight control objective to improve ride qualities or a flight control objective to improve pilot handling qualities using accelerometers 140 and other sensor data 164.

All of these cost functions can be encapsulated into a single cost function for multi-objective flight control system 160 as follows:

$$J = \lim_{t_f \to \infty} \frac{1}{2} \int_0^{t_f} \left[ (Fx - Gr)^\top Q(Fx - Gr) + u^\top R u + q_D \Delta C_D + q_M M^\top M + \sum_{i=4}^{N} J_i \right] dt \quad (6)$$

where x denotes the complete state information of aircraft 100 and aircraft wing 110.

In addition, multi-objective flight control system 160 also includes cruise drag optimization objective 306 by either scheduling or real-time drag optimization. This is considered as a guidance feature in multi-objective flight control system 160 that provides desired flap operation instructions 166 to minimize drag to an auto-pilot cruise control 304 during cruise. The real-time drag optimization may perform aerodynamic model parameter identification to construct a drag model online for use in drag minimization objective 328 and in cruise drag optimization objective 306.

Additional description about the operation of multi-objective flight control system 160 will be presented below.

Control Actuation

Multi-objective flight control system 160 may control the operation of flaps 132 via flap operation instructions 166. Flap operation instructions 166 may be used to enact any pilot commands 162 regarding the steering of the aircraft; however, how such pilot commands 162 are translated into flap operation instructions 166 may be based upon input from one or more of flight modules 320, 322, 324, 326, and 328, each of which shall be discussed in greater detail below.

Control actuator flight module 320 is responsible for processing pilot commands 162 to produce flap operation instructions 166. Flap operation instructions 166 may perform a variety of different types of operations. The two inner chordwise flap segments (such as segments 220 and 230 of FIG. 3) can be driven by slow actuation systems such as shaped memory alloy (SMA) actuators 212 which are slow actuators suitable only for changing the flap settings in conjunction with outer chordwise flap segments (such as segments 240 of FIG. 3) for performing cruise drag optimization objective 306.

For fast-acting flight control functions, the outermost chordwise flap segments (such as segment 240 in FIG. 3) are designed to be fast acting flight control surfaces driven by fast actuation systems such as hydraulic or electro-mechanical (EMA) actuators 216. These flap segments span the entire wing and are assumed to have the required bandwidth and control power for performing aeroelastic mode suppression objective 322, drag minimization objective 328, load alleviation objective 324, and other flight control objectives while tracking pilot commands 162.

Aeroservoelastic (ASE) Mode Suppression

Aeroservoelastic mode suppression is a structural control technique that effectively introduces additional damping to aircraft wing 110 in order to improve its structural stability characteristics. Aeroservoelastic mode suppression and flutter suppression can be viewed as similar flight control objectives of improving structural stability or flutter margin of a flexible wing. The subtle difference is that aeroservoelastic mode suppression is employed for an aircraft that operates in a flutter-free operation, whereas flutter suppression is employed for an aircraft that is assumed to operate in a flutter condition. Structural dynamics of flexible aircraft wing 110 contain an infinite number of aeroservoelastic modes, in theory. These modes are the manifestation of the energy balance between the kinetic energy due to the mass properties of aircraft wing 110 and multi-functional flight control surface system 120, and potential energy of the structure of aircraft wing 110 and multi-functional flight control surface system 120. Aerodynamic forces also contribute energy to aircraft wing 110. When the work done by the aerodynamic forces is positive and in excess of the energy dissipation due to the inherent structural damping that exists in the structure of aircraft wing 110, a structural instability known as flutter occurs. Flutter is a destructive structural vibration problem that can destroy an aircraft wing.

Aeroservoelastic mode suppression typically employs a wide variety of different techniques which generally fall under a general category of output feedback. Since the structural dynamics of flexible aircraft wing 110 contain infinite number of aeroservoelastic modes, the complete state information of aircraft wing 110 is usually not available nor is it measurable. Rather, the output of sensor data 164 which includes at least accelerometers 140 can be used to reconstruct the state information of aircraft wing 110 using a state observer system 314 as shown in FIG. 8. In some embodiments, state observer system 314 can be designed using the Luenberger's observer technique.

To formulate a control for aeroservoelastic mode suppression objective 322, an approach is to use the standard linear-quadratic Gaussian (LQG) optimal control technique which requires solving a standard matrix equation known as the Ricatti equation. According to the present invention, multi-objective flight control system 160 has to consider simultaneously multiple flight control objectives including drag minimization objective 328 and load alleviation objective 324. This multi-objective consideration leads to a modified optimal control technique according to the present invention which requires solving a modified Ricatti equation to include the sensitivities of the drag minimization objective 328 and load alleviation objective 324.

According to embodiments of the present invention, sensor-driven objective prioritization technique 310 can be implemented to automatically adjust the weighting matrix $Q_e$ in equation (3) as the sensor signal increases. This enables the aeroservoelastic mode suppression objective 322 to smoothly transition between a low priority mode when the weighting matrix $Q_e$ is close to zero to a high priority mode when the weighting matrix $Q_e$ is the largest depending on the amplitude of the sensor signal.

Detailed description of sensor-prioritization technique 310 will be presented subsequently.

Drag Minimization

In-flight, aerodynamic drag force is in balance with the thrust force produced by aircraft engines. Drag is contributed by many factors and can generally be broken down into viscous or skin friction drag, form or pressure drag, wave drag, and lift-induced or simply induced drag. In aircraft performance, drag is frequently described by a quadratic relationship with lift. This is called a quadratic drag polar and is described by the following equation:

$$C_D = C_{D_0} + K C_L^2 \tag{7}$$

where $C_D$ is the drag coefficient, $C_{D_0}$ is the parasitic drag coefficient that comprises viscous drag and form drag, $C_L$ is the lift coefficient, and K is a drag polar parameter which is also given by:

$$K = \frac{1}{\pi A \cdot R \cdot e} \tag{8}$$

where A.R. is the wing aspect ratio and e is the span efficiency which is a measure of how aerodynamically efficient an aircraft wing is in generating lift and has a value between 0 and 1. When an aircraft flies in the transonic Mach range typically above Mach 0.7 but below Mach 1, shocks are typically formed on the upper surface of an aircraft wing. The Mach number is the ratio of the aircraft flight speed to the speed of sound. The shocks create a pressure loss which is translated into drag and this type of drag is called wave drag. Thus, in general, drag is a function of the lift coefficient and the Mach number. The parasitic drag coefficient $C_{D_0}$ and the drag polar parameter K therefore are a function of the Mach number.

The lift coefficient is generally a linear function of the aircraft angle of attack in the small angle of attack range when the airflow is fully attached to the surface of the aircraft wing. Deflections of flight control surfaces also contribute linearly to the lift coefficient when the deflections are small. The lift coefficient of an aircraft is contributed by the section lift coefficient of a wing section and is expressed in general as:

$$c_l = c_{l_0} + c_{l_\alpha} \alpha_{\text{eff}} \tag{9}$$

where $c_l$ is the section lift coefficient, $c_{l_0}$ is the lift curve slope, and $\alpha_{\text{eff}}$ is the effective section angle of attack which is a function of the aircraft states and the wing aeroelastic deflections. The effective section angle of attack includes contribution of the aircraft states, contribution of the deflections of flight control surfaces, and contribution of the wing bending deflection and twist. The effective section angle of attack may be expressed in general as:

$$\alpha_{\text{eff}} = \alpha + \alpha_\omega \omega + \alpha_\delta \delta + \Theta \cos \Lambda + \frac{dW}{dy} \sin \Lambda \tag{10}$$

where $\alpha$ is the aircraft angle of attack, $\omega$ is the aircraft angular velocity vector which contains the three components in the roll, pitch, and yaw axes, $\alpha_\omega$ is the angle of attack sensitivity with respect to the aircraft angular velocity, $\delta$ is the deflection vector of flight control surfaces, $\alpha_\delta$ is the angle of attack sensitivity with respect to the flap deflections, $\Theta$ is the wing torsional twist, W is the wing bending deflection, dw/dy is the wing bending deflection slope with respect to the elastic axis denoted by $\bar{y}$, and $\Lambda$ is the sweep angle of the elastic axis.

The aircraft lift coefficient is the sum of all the contributions of the individual section lift coefficients. Therefore, in general, the aircraft lift coefficient or lift coefficient for brevity can be expressed in terms of the complete state information of aircraft 100 and aircraft wing 110 and the deflections of multi-functional flight control surface system 120 as:

$$C_L = \overline{C}_L + C_{L_x} x + C_{L_u} u \qquad (11)$$

where $\overline{C}_L$ is the trim lift coefficient when aircraft 100 operates in a steady trimmed flight, $C_{L_x}$ is the lift sensitivity with respect to the state information x, and $C_{L_u}$ is the lift sensitivity with respect to the deflections of multi-functional flight control surface system 120.

The trim drag coefficient can be expressed as:

$$\overline{C}_D = C_{D_0} + K\overline{C}_L^2 \qquad (12)$$

The incremental drag coefficient then can be expressed in general as:

$$\Delta C_D = C_D - \overline{C}_D = K(C_L^2 - \overline{C}_L^2) = C_{D_x} x + C_{D_u} u + x^T C_{D_{x^2}} x + x^T C_{D_{xu}} u + u^T C_{D_{u^2}} u \qquad (13)$$

where $$C_{D_x} = 2\overline{C}_L K C_{L_x} \qquad (14)$$

$$C_{D_u} = 2\overline{C}_L K C_{L_u} \qquad (15)$$

$$C_{D_{x^2}} = C_{L_x}^T K C_{L_x} \qquad (16)$$

$$C_{D_{xu}} = 2 C_{L_x}^T K C_{L_u} \qquad (17)$$

$$C_{D_{u^2}} = C_{L_u}^T K C_{L_u} \qquad (18)$$

The aeroelasticity of aircraft wing 110 can affect aerodynamic drag of aircraft 100. As aircraft 100 cruises, fuel which is stored inside aircraft wing 110 is burned continuously. The change in the fuel weight during cruise results in changes in the wing bending deflection and twist, thereby contributing to a change in the effective angle of attack, which is sometimes called the aeroelastic wash-out twist. Aircraft wing 110 is generally designed to be most aerodynamically efficient at a single fuel weight point which is usually 50% fuel weight. Thus, any changes in the aeroelastic wash-out twist away from the design point of aircraft wing 110 will result in an increase in drag. This operation is referred to as an off-design operation. Furthermore, aircraft wing 110 is generally designed to be most aerodynamic efficient at a single flight condition usually defined by the design lift coefficient which is typically about 0.5. Operating at any flight conditions away from the design lift coefficient will result in a reduction in the aerodynamic efficiency usually defined by the quantity L/D.

Previous drag minimization technique includes iterative peak-seeking control which essentially performs an online gradient optimization to minimize fuel flow instead of drag. In contrast, embodiments of the invention include multi-functional flight control surfaces to address other flight control objectives, accounting for the aeroelasticity of flexible aircraft wing 110, and an analytical closed-form optimal control solution. According to the present invention, aeroelastic wing shaping control is an effective strategy for drag minimization that uses multi-functional flight control surface system 120 to impart loads onto aircraft wing 110 to compensate for changes in the aeroelastic wash-out twist or operating lift coefficient during off-design cruise flight. In some embodiments, multi-objective flight control system 160 performs drag minimization objective 328 by minimizing the cost function $J_D$ which produces a closed form optimal control solution of flap operation instructions 166 to provide deflection commands to multi-functional flight control surface 120. When incorporated in a multi-objective optimal control framework, the optimal control solution is computed from a modified optimal control technique according to the present invention which includes solving a modified Ricatti equation that contains the sensitivities of the drag minimization objective 328 and load alleviation objective 324.

In some flight operations, drag minimization objective 328 and load alleviation objective 324 can be in conflict since it may not be feasible to satisfy both objectives simultaneously. Sensor-driven objective prioritization technique 310 can be employed according to the present invention to smoothly and automatically transition from drag minimization objective 328 to load alleviation objective 324 if needed by a particular flight operation. Accordingly, the weighting coefficient $q_D$ in equation (4) can be made to smoothly vary from near zero corresponding to a low priority mode to the largest value corresponding to a high priority mode. Detailed description of sensor-prioritization technique 310 will be presented subsequently.

Cruise drag optimization objective 306 addresses the guidance requirement for auto-pilot cruise control 304 during cruise. It is responsible for performing a model identification technique to identify drag and lift sensitivities that can be used to construct a mathematical model of the incremental drag coefficient according to equation (13). Excitation command signals of multi-functional flight control surface system 120 are generated by multi-objective flight control system 160 to slightly change the operating condition of aircraft 100. Drag measurements from sensor data 164 are acquired and used to estimate model parameters using a standard least-squares technique.

A subtle difference between cruise drag optimization objective 306 and drag minimization objective 328 should be noted. Cruise drag optimization objective 306 is a single-objective optimization that addresses drag minimization for trimmed flight for use in conjunction with auto-pilot cruise control 304. Essentially, cruise drag optimization objective 306 computes the optimal trim angle of attack and deflections of multi-objective flight control surface system 210 to maintain trimmed level flight. On the other hand, drag minimization objective 328 is employed in conjunction with the other flight control objectives in multi-objective flight control system 160 for dynamic flight or steady trimmed flight.

Gust and Maneuver Load Alleviation

Aircraft wing 110 typically experiences a wide range of loading during a given flight profile which typically involves dynamic maneuvers and gust encounters. The structural loads imparted onto aircraft wing 110 can cause structural integrity issues such as overstress or high-cycle fatigue. During a trimmed level flight, the aerodynamic lift force is in balance with the gross weight of aircraft 100. The load factor which is defined to be the ratio of the lift force to the gross weight attains a value of 1 for trimmed level flight. During a dynamic maneuver such as a roll maneuver, the load factor increases to a value greater than 1. Aircraft wing 110 is normally designed to meet a maximum load factor of 2.5 and a minimum load factor of −1. Thus, maneuver loads that are too close to the maximum load factor or minimum load factor can cause structural loading concerns. Therefore, maneuver load alleviation objective 324 is an important consideration in flight operation.

Conventional aircraft that lack multi-functional flight control surfaces generally do not have the capability for maneuver load alleviation. In some embodiments, maneuver load alleviation is achieved by using flight control surfaces on an aircraft wing to change the lift distribution. In embodiments of the present invention, multi-functional flight control surface system 120 employs a plurality of flaps 132 disposed along aircraft wing 110. Flaps 132 of multi-functional flight control surface system 120 can be employed to change the lift distribution on aircraft wing 110. During cruise, the lift distribution on aircraft wing 110 generally follows an elliptical-like shape in order to achieve the aerodynamic efficiency since the ideal elliptical lift distribution is the most aerodynamically efficient lift distribution that corresponds to the minimum induced drag. During a maneuver, flap operation instructions 166 can be computed by multifunctional flight control surface system 160 to specify deflection commands for flaps 132 of multi-functional flight control surface system 120 to change the lift distribution in a way that results in a reduction in the wing root bending moment by shifting the lift distribution toward the inboard of aircraft wing 110, thus resulting in a triangular-like shape. At the same time, multi-functional flight control system 160 also computes a new angle of attack in order to produce the lift requirement during the maneuver in conjunction with the deflections of flaps 132 of multi-functional flight control surface system 160.

During a gust encounter, the turbulence velocity of the gust system effectively changes the effective section angle of attack as follows:

$$\alpha_{e\!f\!f} = \alpha + \alpha_\omega \omega + \alpha_\delta \delta + \Theta \cos\Lambda + \frac{dW}{dy}\sin\Lambda + \Psi(s)\frac{w_g}{V} \quad (19)$$

where $w_g$ is the vertical turbulence velocity component, V is the aircraft flight speed, and $\Psi(s)$ is a transfer function in the Laplace s-domain which represents the delay of the gust penetration that is felt by aircraft wing 110.

Thus, gust loads due to a gust encounter can create additional aerodynamic forces and moments imposed on aircraft 100 and aircraft 110. Gust load alleviation objective 324, therefore, is an important consideration in flight operation.

Conventional aircraft that lack multi-functional flight control surfaces generally do not have the capability for gust load alleviation. Gust load alleviation is achieved by using flight control surfaces on an aircraft wing to change the lift distribution. In the present invention, flaps 132 of multi-functional flight control surface system 120 can be employed to change the lift distribution on aircraft wing 110 advantageously to accomplish gust load alleviation objective 324. Flap operation instructions 166 can be computed by multi-functional flight control surface system 160 to specify deflection commands for flaps 132 of multi-functional flight control surface system 120 to change the lift distribution in a way that results in a reduction in the wing root bending moment during a gust encounter.

Since both maneuver load and gust load alleviation involves reducing the wing root bending moment, the two objectives are essentially one and the same with the only difference is the gust contribution to the wing root bending moment which can be expressed in general as:

$$M = M_x x + M_u u + M_w w \quad (20)$$

where M denotes a structural load metric vector at specified locations on aircraft wing 110 which could include the root location for a cantilever wing configuration or other locations of critical loading, $M_x$ is the structural load sensitivity with respect to the state information x, $M_u$ is the structural load sensitivity with respect to the deflections of flaps 132, $M_w$ is the structural load sensitivity with respect to the gust input w which contains relevant information about the turbulence velocity component $w_g$. Thus, in maneuvers, the wing root bending moment does not depend on the gust input w unless the maneuvers take place simultaneously with gust encounters.

While wing bending moment is an important structural load metric, it is not the only metric. Other structural metrics could be employed in multi-objective flight control system 160 for load alleviation objective 324. For example, other structural load metrics could be the wing twist moment or wing lift for which the expression in equation (20) is equally valid. Thus, the wing root bending moment is generally applicable to any structural load metrics for which equation (20) is valid.

The wing root bending moment as a structural load metric can be readily measured from sensor data 164 which includes strain gauge 150 for use in multi-objective flight control system 160.

Embodiments of the invention provide an improvement over previous gust load alleviation approaches, which typically address gust load alleviation as a single flight control objective. In contrast, embodiments synthesize optimal control solutions that incorporate other important flight control objectives such as drag minimization objective 328 and aeroelastic mode suppression objective 322. Multi-objective flight control system 160 performs load alleviation objective 324 by minimizing the cost function $J_M$ which produces a closed-form optimal control solution of flap operation instructions 166 to provide deflection commands to multi-functional flight control surface 120. When incorporated in a multi-objective optimal control framework, the optimal control solution is computed from a modified optimal control technique according to the present invention which includes solving a modified Ricatti equation that contains the sensitivities of the drag minimization objective 328 and load alleviation objective 324.

In some flight operations, drag minimization objective 328 and load alleviation objective 324 can be in conflict since it may not be feasible to satisfy both objectives simultaneously. Sensor-driven objective prioritization technique 310 can be employed according to the present invention to smoothly and automatically transition from drag minimization objective 328 to load alleviation objective 324 as required by a particular flight operation. Accordingly, the weighting coefficient $q_M$ in equation (5) can be made to smoothly vary from near zero corresponding to a low priority mode to the largest value corresponding to a high priority mode.

Detailed description of sensor-prioritization technique 310 will be presented subsequently.

Gust Estimation

Gust estimation is an important consideration in gust load alleviation objective 324. Accordingly, multi-objective flight control system 160 includes a gust estimation module 312. Referring to FIG. 8, multi-objective flight control system 160 requires knowledge of the gust input w currently affecting aircraft 100 in order to be fully implemented. Conventional aircraft do not have the ability to measure this gust information, but there are sensors available that are designed to detect clear air turbulence that could be employed for gust estimation module 312. According to the present invention, gust estimation module 312 calculates an estimate of the gust input, denoted as $\hat{w}$, based on sensor data 164 which may include accelerometers 140 on aircraft wing 110, normal accelerometers 142 and axial accelerometers 146 on aircraft 100, and pressure sensors 148.

In one embodiment, the gust contribution to the rigid-body dynamics of aircraft 100, denoted by $\hat{w}_r$, is estimated using normal accelerometers 142 and axial accelerometers 146 on aircraft 100, as illustrated in FIG. 6. The gust contribution to the structural dynamics of aircraft wing 110, denoted by $\hat{w}_e$, is estimated using accelerometers 140 on aircraft wing 110, as illustrated in FIG. 6. The rigid and elastic gust contributions are combined to form the entire gust estimate for use in multi-objective flight control system 160 as shown below:

$$\hat{w} = \begin{bmatrix} \hat{w}_r \\ \hat{w}_e \end{bmatrix} \quad (21)$$

During a gust encounter with a symmetric distribution of the vertical turbulence velocity component $w_g$, the motion of aircraft 100 has a predominant response in the longitudinal direction. The dynamics for the longitudinal aircraft states that comprise the angle of attack $\alpha$ and pitch rate q will have dominant gust contributions. The vertical turbulence velocity component $w_g$ generally has a small contribution to the flight speed dynamics of aircraft 100. Therefore, the rigid gust estimate $\hat{w}_r$ can be assumed to contain only two components: one associated with the angle of attack dynamics and the other associated with the pitch dynamics. This is expressed as:

$$\hat{w}_{\alpha q} = \begin{bmatrix} \hat{w}_\alpha \\ \hat{w}_q \end{bmatrix} \quad (22)$$

where $\hat{w}_\alpha$ is the rigid gust estimate associated with the angle of attack dynamics and $\hat{w}_q$ is the rigid gust estimate associated with the pitch rate dynamics.

Using at least two normal accelerometer 142, denoted by $a_z$, to estimate $\hat{w}_{\alpha q}$ is therefore sufficient to yield accurate gust estimation.

The estimate of normal acceleration 142, denoted by $\hat{a}_z$, is computed as $$\hat{a}_z = \eta (A_{long} x_{long} + A_{long_e} \hat{x}_e + B_{long} u + \hat{w}_{\alpha q}) \quad (23)$$

where $$x_{long} = \begin{bmatrix} \alpha \\ q \\ V \\ \theta \\ h \end{bmatrix} \quad (24)$$

$\hat{x}_e$ is the elastic state estimate computed from state observer 314 as illustrated in FIG. 8, and $$\eta = \begin{bmatrix} V & -\varepsilon \\ V & l_t \end{bmatrix} \quad (25)$$

where V is the aircraft flight speed, $\theta$ is the pitch angle, h is the altitude, $\varepsilon$ is the distance between aircraft center of gravity and forward normal accelerometers 142 that is sufficiently small so that forward normal accelerometer 142 is in close proximity to the aircraft center of gravity, $l_t$ the distance between the aircraft center of gravity and aft normal accelerometer 142 that is sufficiently large so that aft normal accelerometer 142 is disposed close to the vertical tail of aircraft 100, and $A_{long}$, $A_{long_e}$, and $B_{long}$ are some appropriate matrices.

The estimation error of the normal acceleration measurements then is computed as:

$$\varepsilon_z = \hat{a}_z - a_z \quad (26)$$

Finally, the appropriate correction to the current rigid gust estimate associated with the angle of attack and pitch dynamics is computed by an embodiment according to a modified least-squares gradient adaptive law as follows:

$$\dot{\hat{w}}_{\alpha q} = -\Gamma(\eta^{-1} \varepsilon_z + \nu \hat{w}_{\alpha q}) \quad (27)$$

where $\Gamma$ is a positive, user-selected learning rate that determines how aggressively the gust estimate is updated at each time step during the gust estimation. The parameter $\nu$ is a positive, user-selected value that provides damping to the modified least-squares gradient adaptive law and can improve stability of gust estimation module 312. Gust estimation module 312 computes the rigid gust estimate $\hat{w}_r$ starting with an initial guess. Then, at each time step, the rigid gust estimate $\hat{w}_r$ is updated using the adaptive law according to equation (27) and the process continues with new measurements from normal accelerometers 142 at the next time step.

When the vertical turbulence velocity component $w_g$ has an asymmetric distribution, in addition to the rigid gust components for the angle of attack and pitch rate dynamics, a rigid gust component associated with the roll dynamics also exists. To estimate this additional rigid gust component, at least two accelerometers 140 disposed on each side of aircraft wing 110 in an equal distance from the roll axis, denoted by $y_w$, may be used. The roll acceleration can then be computed as:

$$\dot{p} = y_w (a_l - a_r) \quad (28)$$

where $\dot{p}$ is the roll acceleration, $a_l$ denotes the acceleration measurement from accelerometer 140 on the left side of aircraft wing 110, and $a_r$ denotes the acceleration measurement from accelerometer 140 on the right side of aircraft wing 110.

When the lateral turbulence velocity component $v_g$ is not zero, a lateral acceleration is experienced by aircraft 100 due to the rigid gust component associated with the yaw dynamics. To estimate this gust component, lateral accelerometer 147, denoted by $a_v$, disposed on the vertical tail of aircraft 100 can be used. The yaw acceleration can then be computed as:

$$\dot{r} = x_v a_v \quad (29)$$

where $\dot{r}$ is the yaw acceleration.

The estimates of the roll and yaw accelerations may be determined by a computerized component of an embodiment as follows:

$$\hat{a}_{pr} = \begin{bmatrix} \dot{p} \\ \dot{r} \end{bmatrix} = A_{lat} x_{lat} + A_{lat} \hat{x}_e + B_{lat} u + \hat{w}_{pr} \quad (30)$$

where $A_{lat}$, $A_{lat_e}$, and $B_{lat}$ are some appropriate matrices.

The estimation error of the roll and yaw acceleration measurements may be determined by a computerized component of an embodiment as follows:

$$\varepsilon_{pr} = \hat{a}_{pr} - a_{pr} \quad (31)$$

where $$a_{pr} = \begin{bmatrix} \dot{p} \\ \dot{r} \end{bmatrix} \quad (32)$$

Finally, the appropriate correction to the current rigid gust estimate associated with the roll and yaw dynamics is computed by a computerized component of an embodiment in accordance with a modified least-squares gradient adaptive law as follows:

$$\dot{\hat{w}}_r = -\Gamma(\varepsilon_{pr} + v\hat{w}_{pr}) \quad (33)$$

The total rigid gust estimate can be combined for both the longitudinal and lateral-direction dynamics and is given by:

$$\hat{w}_r = \begin{bmatrix} \hat{w}_\infty \\ \hat{w}_q \\ \hat{w}_p \\ \hat{w}_r \end{bmatrix} \quad (34)$$

To compute the elastic gust estimate $\hat{w}_e$, accelerometers 140 on aircraft wing 110, denoted by $a_w$, are used as illustrated in FIG. 6. The estimate of the normal acceleration on aircraft wing 110 is determined by an embodiment as follows:

$$\hat{a}_w = A_{w_r} x_r + A_{w_e} \hat{x}_e + B_w u + C_{wr} \hat{w}_r + C_{we} \hat{w}_e \quad (35)$$

where $A_{w_r}$, $A_{w_e}$, $B_w$, $C_{wr}$, and $C_{we}$ are some appropriate matrices.

Then, the estimation error of the normal acceleration on aircraft wing 110 is computed as:

$$\varepsilon_w = \hat{a}_w - a_w \quad (36)$$

Since the number of the elastic gust components is greater than the number of acceleration measurements on aircraft wing 110, the appropriate correction to the current elastic gust load may be computed by a computerized component of an embodiment by using modified pseudo-inverse least-squares gradient adaptive law as follows:

$$\dot{\hat{w}}_e = -\Gamma[C_{w_e}^T (C_{w_e} C_{w_e}^T)^{-1} \varepsilon_w + v\hat{w}_e] \quad (37)$$

Since there are fewer normal acceleration measurements from accelerometers 140 on aircraft wing 110 than the number of the elastic gust components associated with the aeroservoelastic modes of aircraft wing 110, the estimation of the elastic gust $\hat{w}_e$ is in a least-squares average sense. The elastic gust estimate $\hat{w}_e$ will not in general closely match the true elastic gust for all the aeroservoelastic modes.

Figure 9:
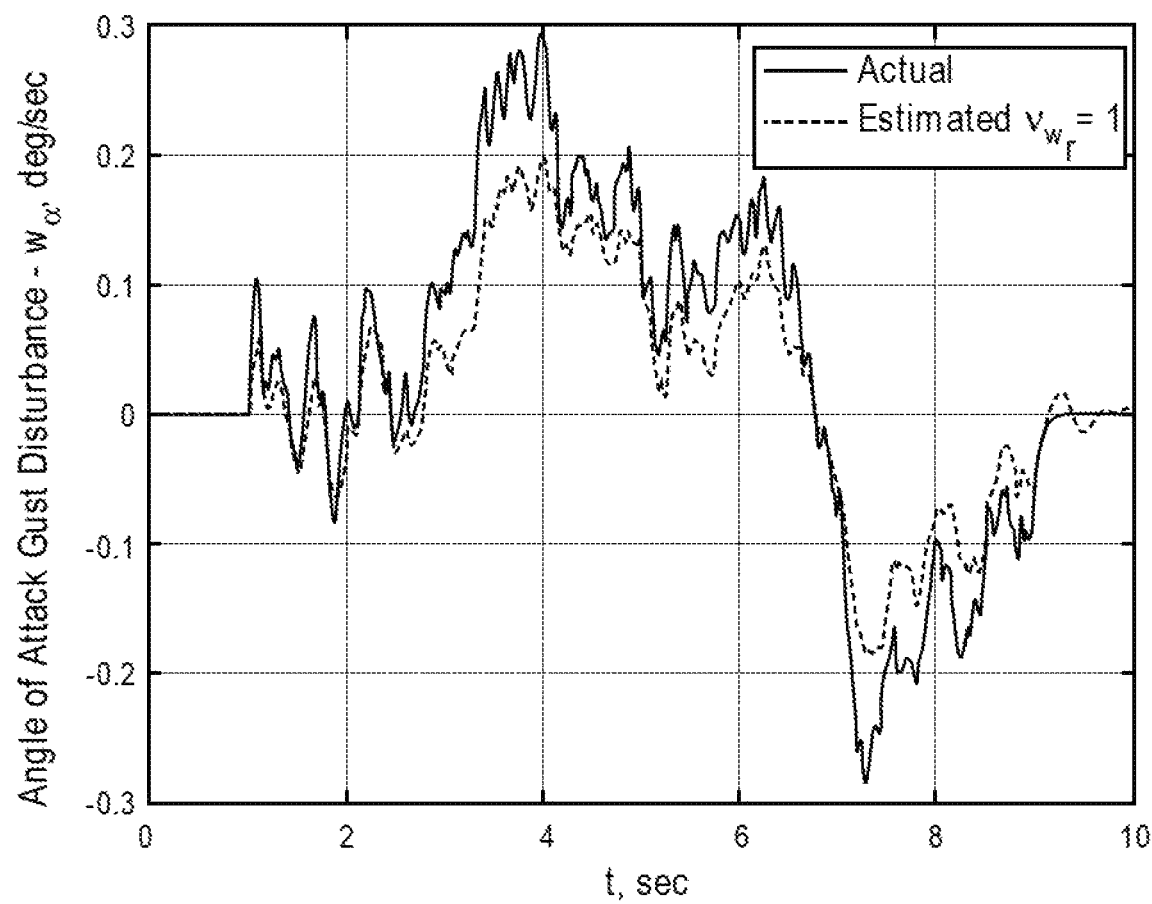
FIG. 9 is a graph illustrating the difference between estimated and actual angle of attack gust disturbance according to an embodiment of the invention.

In some embodiments, the performance of gust estimation module 312 of multi-objective flight control system 160 can be assessed in simulations for a transport aircraft experiencing a continuous gust. FIG. 9 illustrates the actual rigid gust component $w_\infty$ associated with the angle of attack dynamics and its estimate using $\Gamma=100$ and $v=1$. Good agreement between the actual rigid gust and its estimate is observed.

Figure 10:
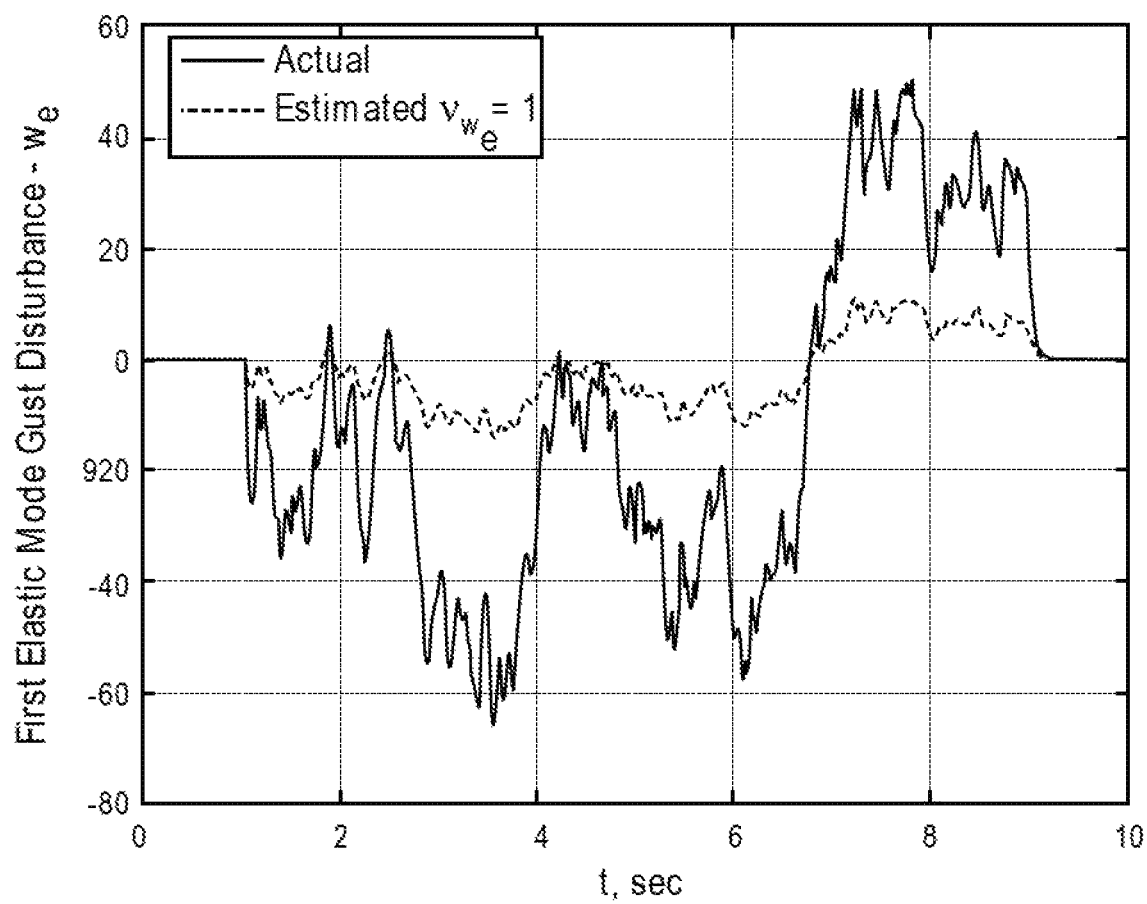
FIG. 10 is a graph illustrating estimated and actual elastic mode gust disturbances using data collected from accelerometers according to an embodiment of the invention.

FIG. 10 illustrates one of the actual elastic gust components and its estimate using only two accelerometers 140 according to an embodiment of the invention. While the trend of the elastic gust estimate is correct, the scale of the estimate is not in agreement with the actual elastic gust component. In general, gust estimation module 312 produces more accurate rigid gust component estimates than elastic gust component estimates as there are typically a far greater number of aeroservoelastic modes than the number of accelerometers 140 on aircraft wing 110. If dominant aeroservoelastic modes are known, then it is possible to design gust estimation module 312 to produce more accurate elastic gust component estimates for the dominant aeroservoelastic modes by selecting the same number of accelerometers 140 as the number of dominant aeroservoelastic modes.

To improve the performance of gust estimation module 312 for estimating the elastic gust contribution $w_e$, according to an alternative embodiment of the present invention, pressure sensors 148 on aircraft wing 110 can be used as illustrated in FIG. 6. The pressure measurements on the upper surface of aircraft wing 110 from pressure sensors 148 in general provide a good measure of the changes in the section lift coefficients along aircraft wing 110 during a gust encounter. A general requirement for a sensor performance is the high and linear correlation between the sensor reading and the physical parameter that it attempts to measure.

Figure 11:
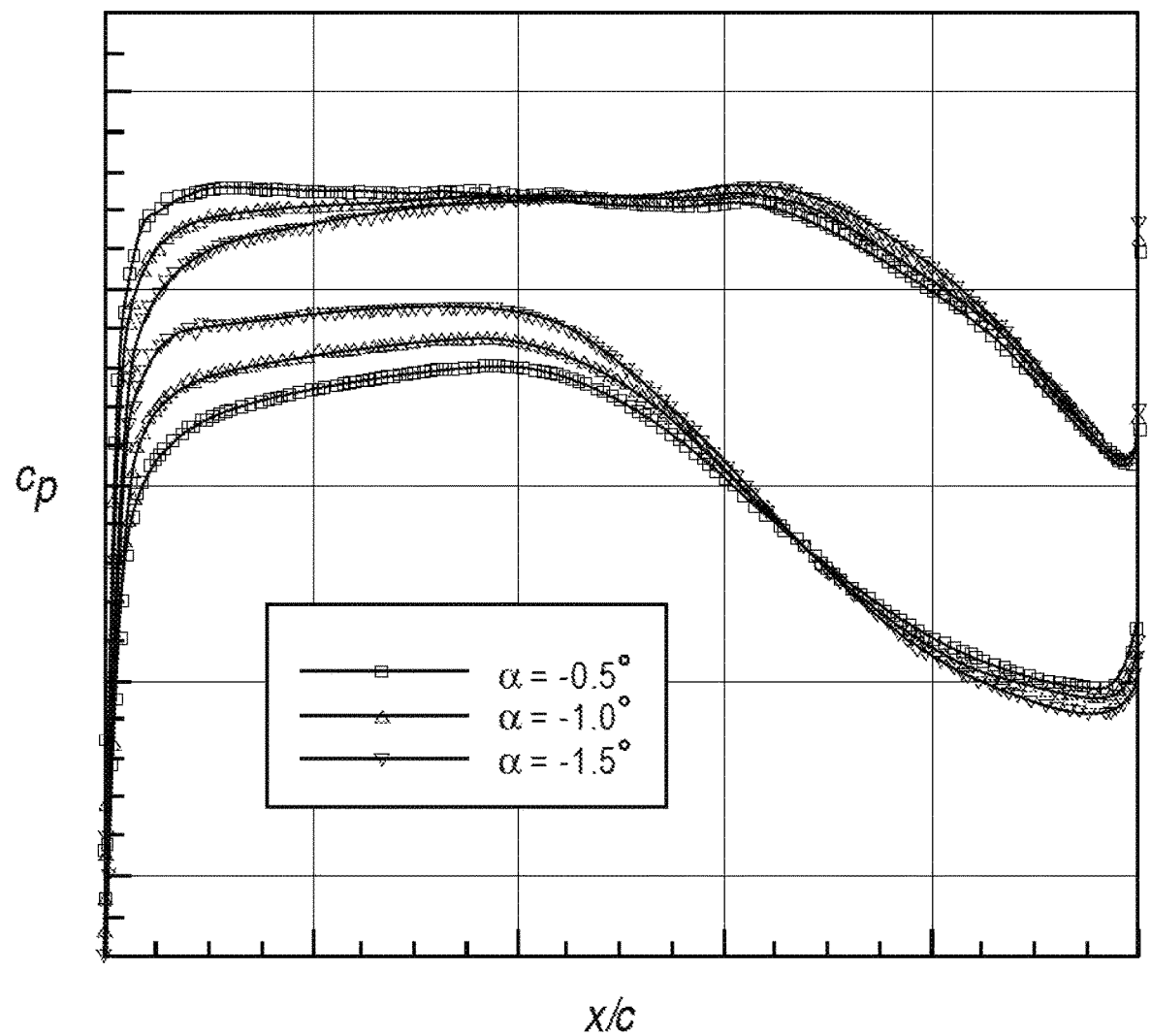
FIG. 11 is a graph illustrating the pressure measurements on an airfoil section of aircraft wing at three different effective angles of attack to illustrate an embodiment of the invention.

FIG. 11 is an illustration of the pressure measurements on an airfoil section of aircraft wing 110 at three different effective angles of attack for a sinusoidal turbulence velocity component $w_g$ as indicated by the pressure coefficient $c_p$ which is defined as $$c_p = \frac{p - p_\infty}{q_\infty} \quad (38)$$

where p is the pressure on the airfoil surface, $p_\infty$ is the free-stream pressure, and $q_\infty$ is the freestream dynamic pressure in accordance with an embodiment. The mean effective angle of attack is shown as $\alpha=-1°$. Thus, the vertical turbulence velocity component $w_g$ causes an oscillatory gust that results in a 0.5° change in the effective angle of attack. The area enclosed by the pressure coefficient $c_p$ versus the normalized airfoil coordinate x/c is a measure of the lift force experienced by the airfoil due to the vertical turbulence velocity component $w_g$.

Figure 12:
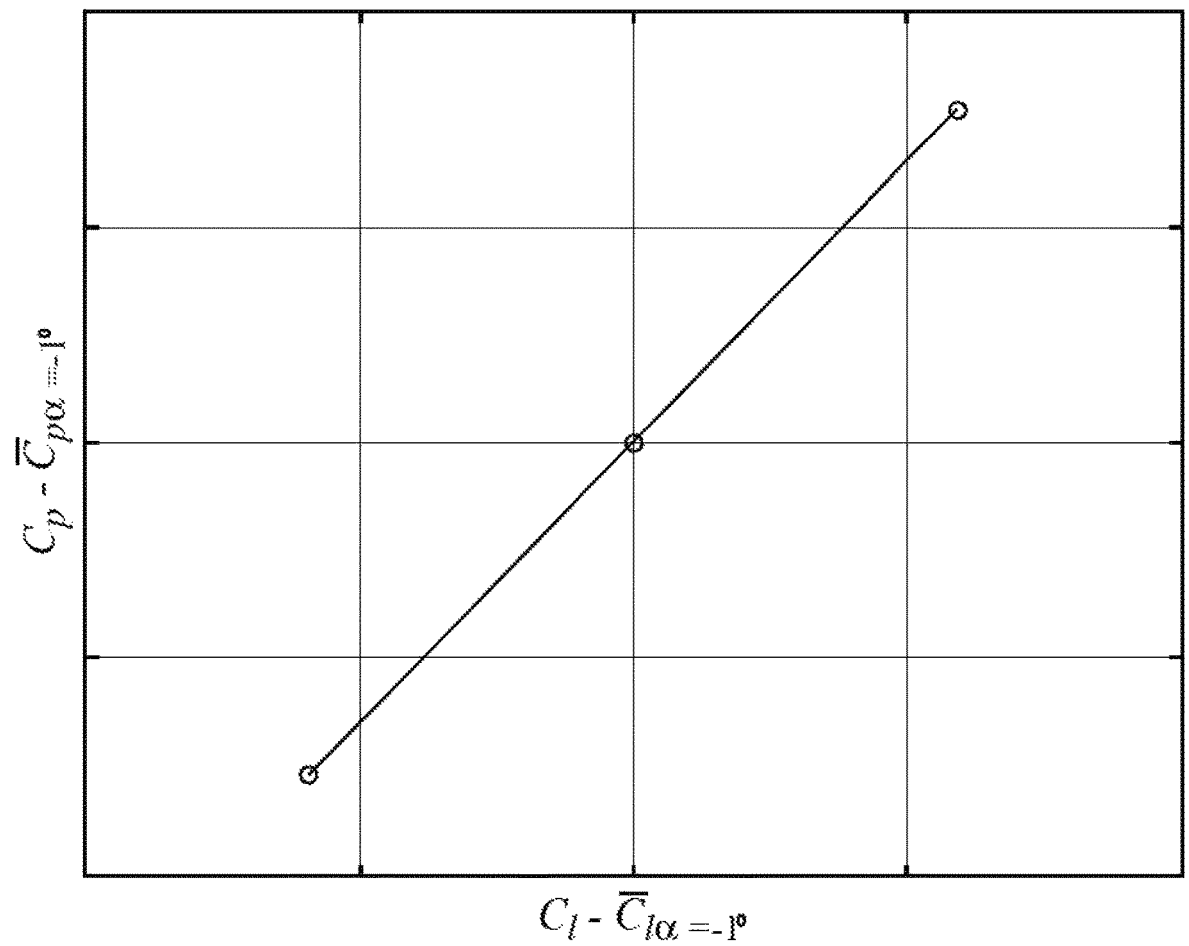
FIG. 12 is a graph illustrating the linear correlation between the differential pressure coefficient $\Delta c_p$ relative to the mean pressure coefficient $\bar{c}_p$ at an airfoil location and the incremental section lift coefficient $\Delta c_l$ relative to the mean section lift coefficient $\bar{c}_l$ to illustrate an embodiment of the invention.

FIG. 12 is an illustration of the linear correlation between the differential pressure coefficient $\Delta c_p$ relative to the mean pressure coefficient $\bar{c}_p$ at an airfoil location and the incremental section lift coefficient $\Delta c_l$ relative to the mean section lift coefficient $\bar{c}_l$ in accordance with an embodiment. The high linear correlation between $\Delta c_p$ and $\Delta c_l$ is a strong indication that the pressure measurements from pressure sensors 148 can be used to estimate the elastic gust contribution.

The incremental section lift coefficient along the span of aircraft wing 110 due to the vertical turbulence velocity component $w_g$ can be computed as $$\Delta c_l = c_{l_p}(p - \bar{p}) \quad (39)$$

where $c_{l_p}$ is a calibration constant for pressure sensors 148 which is effectively the slope of the line in FIG. 12.

Certain computerized components of an embodiment may employ software whose output is determined, at least in part, upon mathematical models maintained thereby. For example, a mathematical model of an aeroservoelastic mode can be expressed as $$m_i\ddot{q}_i + c_i\dot{q}_i + k_i q_i = f_i + \Delta f_i \tag{40}$$

where $q_i$ is called a generalized displacement of the i-th aeroservoelastic mode, $m_i$ is the generalized mass, $c_i$ is the generalized damping, $k_i$ is the generalized stiffness, $f_i$ is the generalized force due to the rigid states $x_r$ and elastic states $x_e$, and $\Delta f_i$ is the incremental generalized force due to the vertical turbulence velocity component $w_9$ which may be computed as $$\Delta f_i = c_i \int_0^L \Delta c_i c \phi_i d\bar{y} \tag{41}$$

where $c_i$ is some constant associated with the i-th aeroservoelastic mode, c is the chord length of the airfoil section of aircraft wing 110 as a function of the wing elastic axis coordinate $\bar{y}$, and $\phi_i$ is the mode shape of the i-th aeroservoelastic mode.

Equation (40) can be expressed in the form of:

$$\begin{bmatrix} \ddot{q}_i \\ \dot{q}_i \end{bmatrix} = \begin{bmatrix} -\dfrac{c_i}{m_i} & -\dfrac{k_i}{m_i} \\ 1 & 0 \end{bmatrix} \begin{bmatrix} \dot{q}_i \\ q_i \end{bmatrix} + \begin{bmatrix} \dfrac{f_i}{m_i} \\ 0 \end{bmatrix} + \begin{bmatrix} \dfrac{\Delta f_i}{m_i} \\ 0 \end{bmatrix} \tag{42}$$

This expression provides directly the elastic gust component estimate for the i-th aeroservoelastic mode which is expressed as:

$$\hat{w}_{e,i} = \begin{bmatrix} \dfrac{\Delta f_i}{m_i} \\ 0 \end{bmatrix} \tag{43}$$

The total elastic gust estimate can be constructed in a similar manner for all the aeroservoelastic modes of interest. This alternative embodiment of gust estimation module 312 should provide more accurate estimation of the elastic gust contribution then the embodiment that uses only accelerometers 140 on aircraft wing 110.

Multi-Objective Flight Control Laws

Aircraft 100 with flexible aircraft wing 110 having multi-functional flight control surface system 120 can be described by a mathematical model as $$\dot{x} = Ax + Bu + w \tag{44}$$

where x is the full state information that describes the rigid-body dynamics of aircraft 100 and structural dynamics of aircraft wing 110 as well as unsteady aerodynamics associated with the dynamic motion of flexible aircraft wing 110, u is a collection of deflections of flap 132 of multi-functional flight control surface system 120, w is the gust input vector comprising the rigid gust contribution and elastic gust contribution, and A and B are some appropriate matrices.

Flap operation instructions 166 are computed by multi-objective flight control system 160 and are used as the deflection commands of flaps 132 of multi-functional flight control surface system 120 by minimizing the following multi-objective cost function:

$$J = \lim_{t_f \to \infty} \frac{1}{2} \int_0^{t_f} \left[ (F_x - G_r)^\top Q (F_x - G_r) + u^\top R_u + q_D \Delta C_D + q_M M^\top M + \sum_{i=4}^N J_i \right] dt \tag{45}$$

For ease of illustration, the cost functions $J_i$, $i=4, \ldots, N$, may be assumed to be zero but otherwise are assumed to be in a positive quadratic or quartic form for a control synthesis in the same manner as the other cost functions. The matrices F and G can be used to select which elements of the state vector x are to be designed to track specified elements of the command vector r. The synthesis of multi-objective flight control system 160 is implemented as a modified optimal control formulation according to the present invention to produce a collection of flap operation instructions 166 for use in specifying the deflection commands of flaps 132 of multi-functional flight control surface system 120 in accordance with the following multi-objective flight control law:

$$u = +K_x \hat{x} + K_r r + K_w \hat{w} + \Lambda_0 \tag{46}$$

where $K_x$, $K_r$, and $K_w$ are appropriate multi-objective control gain matrices and $\Lambda_0$ is a control trim input which has a special meaning that will be described further. The state x is reconstructed from the state estimate $\hat{x}$ by state observer 314 as depicted in FIG. 8 using measurements from sensor data 164. The unknown gust input w is approximated by the gust estimate w using the various embodiments previously described.

According to an embodiment, the control gain matrix $K_x$ is computed from the following expression:

$$K_x = -R^{-1} \left( B^\top W + \frac{1}{2} q_D C_{D_{xu}}^\top + q_M M_u^\top M_x \right) \tag{47}$$

where W is the solution of a modified Ricatti equation according to an embodiment which is given by:

$$W\overline{A} + \overline{A}^T W - W B \overline{R}^{-1} B^T W + \overline{Q} = 0 \tag{48}$$

In the standard optimal control technique, wherever the modified matrices $\overline{A}$, $\overline{Q}$, and $\overline{R}$ appear in the modified Ricatti equation, they are substituted for the unmodified matrices A, Q, and R, respectively. Thus, to contrast with the modified Ricatti equation according to the present invention, it is instructive to show the standard Ricatti equation which is given by:

$$WA + A^T W - W B R^{-1} B^T W + Q = 0 \tag{49}$$

and a control gain matrix $K_x$ $$K_x = -R^{-1} B^T W \tag{50}$$

which does not account for drag optimization objective 328 or load alleviation objective 324 since there are no drag or structural load sensitivities that appear in the control gain matrix $K_x$ expression.

The modified matrices $\overline{A}$, $\overline{Q}$, and $\overline{R}$ are the resultant expressions that explicitly account for drag minimization objective 328 and load alleviation objective 324. They are given by:

$$\overline{A} = A - \frac{1}{2} q_D B R^{-1} C_{D_{xu}}^\top \tag{51}$$

$$\overline{Q} = F^T QF + q_D C_{D_{x^2}}^T - \qquad (52)$$

$$\left(\frac{1}{2} q_D C_{D_{xu}}^T + q_M M_x^T M_x\right)^T \overline{R}^{-1} \left(\frac{1}{2} q_D C_{D_{xu}}^T + q_M M_x^T M_x\right) +$$

$$q_M M_x^T M_x$$

$$\overline{R} = R + \frac{1}{2} q_D C_{D_{u^2}} + q_M M_u^T M_u \qquad (53)$$

The modified matrices $\overline{A}$, $\overline{Q}$, and $\overline{R}$ as well as the control gain matrix $K_x$ can be seen to include explicitly the drag sensitivity matrices $C_{D,2}$, $C_{D_{xu}}$, and $C_{D_{u^2}}$ and the structural load sensitivity matrices $M_x$ and $M_u$.

The weighting coefficients $q_r$ and $q_M$ for drag minimization objective 328 and load alleviation objective 324, respectively, must be selected appropriately to ensure $\overline{Q}$ is a positive-definite matrix whose eigenvalues are all positive real. Moreover, they also need to be selected appropriately to ensure multi-objective optimal performance since drag minimization objective 328 and load alleviation objective 324 can result in conflicting multi-objective performance. Multi-objective Pareto analysis, which will be described subsequently, can be conducted to determine the suitable weighting coefficients $q_D$ and $q_M$ that satisfy mutually drag minimization objective 328 and load alleviation objective 324. Sensor-driven objective prioritization technique 310 can be applied to prioritize drag minimization objective 328 over load alleviation objective 324, or vice versa, depending on a particular flight operation.

The control gain matrix $K_r$ may be determined by an embodiment from the following expression:

$$K_r = -\overline{R}^{-1} B^T V_r \qquad (54)$$

where V is given by $$V_r = \overline{V}^{-1} F^T Q G \qquad (55)$$

and $\overline{V}$ is given by $$\overline{V} = \overline{A}^T - W B \overline{R}^{-1} B^T \qquad (56)$$

The control gain matrix $K_w$ may be computed by an embodiment from the following expression:

$$K_w = -\overline{R}^{-1}(B^T V_w + q_M M_u^T M_w) \qquad (57)$$

where $V_w$ is given by:

$$V_w = \overline{V}^{-1} \left[ -W - q_M M_u^T M_w + \qquad (58)\right.$$

$$\left. q_M \left(WB + \frac{1}{2} q_D C_{D_{xu}} + q_M M_x^T M_u\right)\right] (\overline{R}^{-1} M_u^T M_w)$$

The control trim input $\Lambda_0$ may be computed from the following expression:

$$\Lambda_0 = -\overline{R}^{-1} \left(B^T V_0 + \frac{1}{2} q_D C_{D_u}^T\right) \qquad (59)$$

where $V_0$ is given by:

$$V_0 = \overline{V}^{-1} \left[-\frac{1}{2} q_D C_{D_x}^T + \frac{1}{2} q_D \left(WB + \frac{1}{2} q_D C_{D_{xu}} + q_M M_x^T M_u\right)\overline{R}^{-1} C_{D_u}^T\right] \qquad (60)$$

The control trim input $\Lambda_0$ can be seen to also depend on the drag sensitivity matrices $C_{D_x}$ and $C_{D_u}$ as well as the weighting coefficient $q_D$ for drag minimization objective 328. Its essential function is to provide the ability to re-trim aircraft 100 to meet drag minimization objective 328. For example, to maintain a trimmed level flight that also achieves drag minimization objective 328, the control trim input $\Lambda_0$ provides a signal to change the set point of the angle of attack as flap operation instructions 166 are sent to flaps 132 of multi-functional flight control surface system 120.

Figure 13:
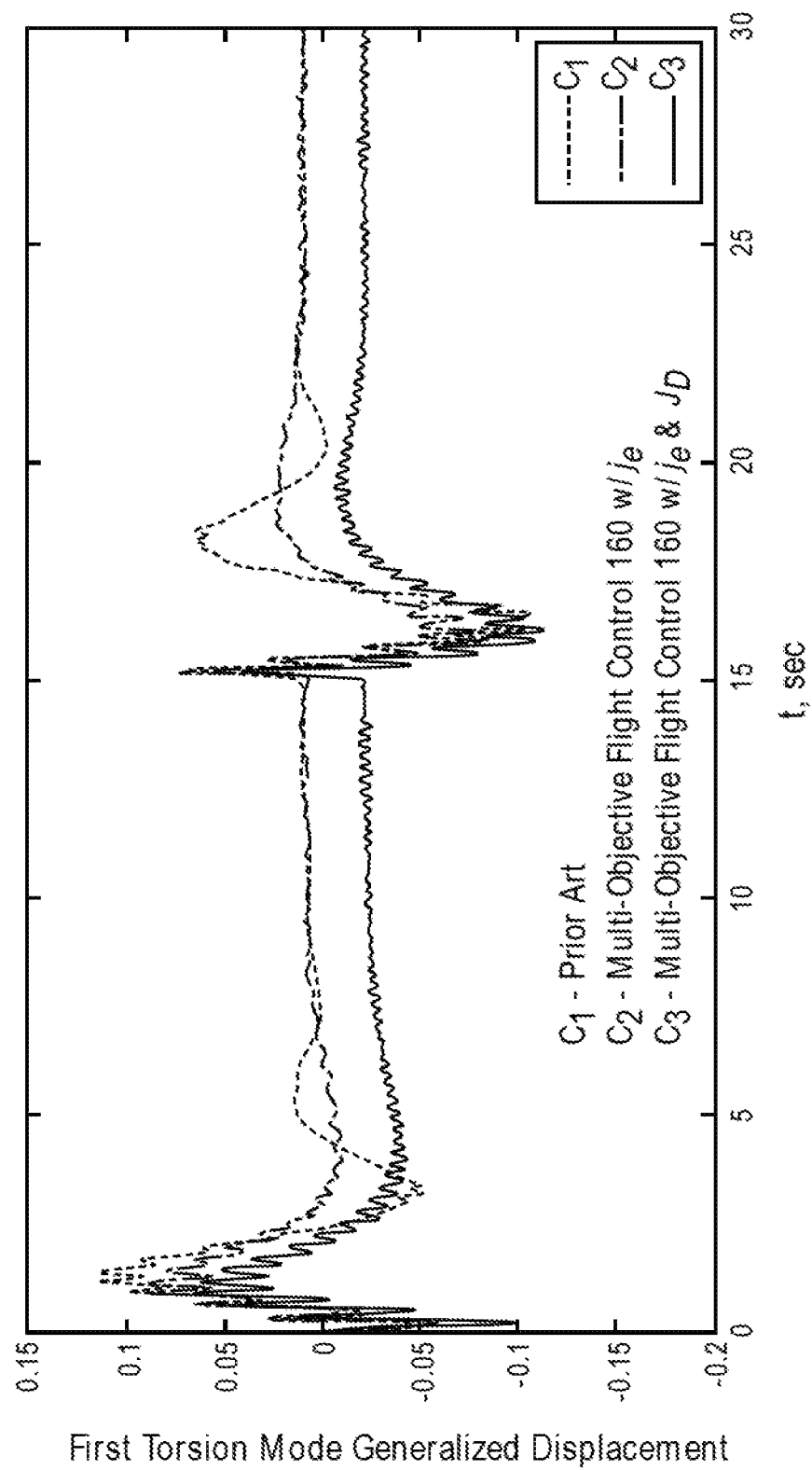
FIG. 13 is a graph illustrating the first torsion mode generalized displacement in response to multi-objective flight control system in accordance with an embodiment of the invention.

FIG. 13 is a graph of the first torsion mode generalized displacement in response to multi-objective flight control system 160 with drag minimization objective 328 applied to a transport aircraft model to illustrate the effect of the control trim input $\Lambda_0$ in accordance with an embodiment. The shift in the generalized displacement of the first torsion mode when the drag minimization objective 328 is active in the multi-objective flight control system 160 is due to the control trim input $\Lambda_0$ which specifies a nose-down twist of aircraft wing 110 when the downward deflections of flap 132 are applied. This effectively reduces the section angle of attack to minimize drag.

Figure 14:
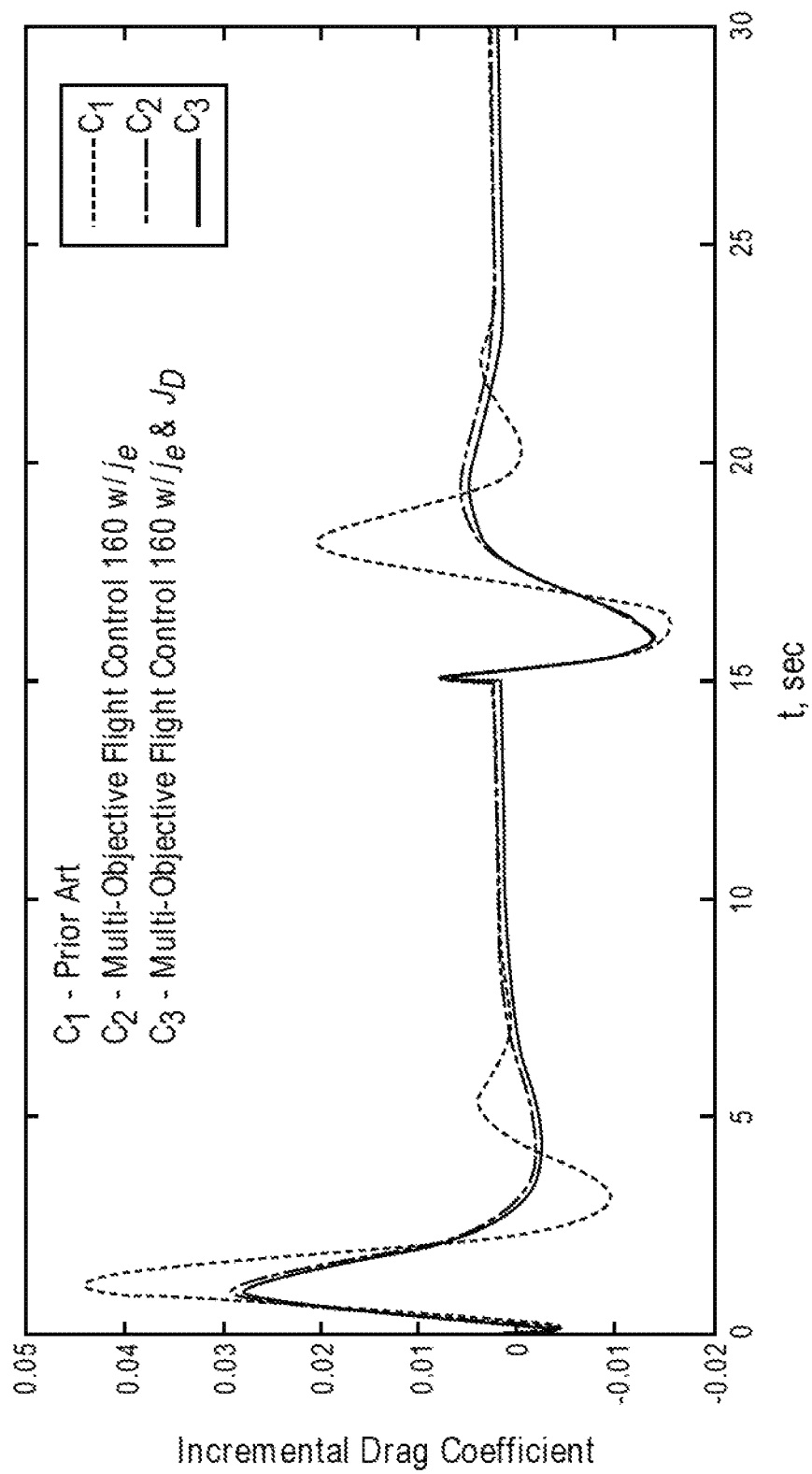
FIG. 14 is a graph illustrating the incremental drag coefficient $\Delta C_D$ in response to multi-objective flight control system in accordance with an embodiment of the invention.

FIG. 14 is a graph of the incremental drag coefficient $\Delta C_D$ in response to multi-objective flight control system 160 clearly showing the drag reduction due to drag minimization objective 328 in accordance with an embodiment.

Figure 15:
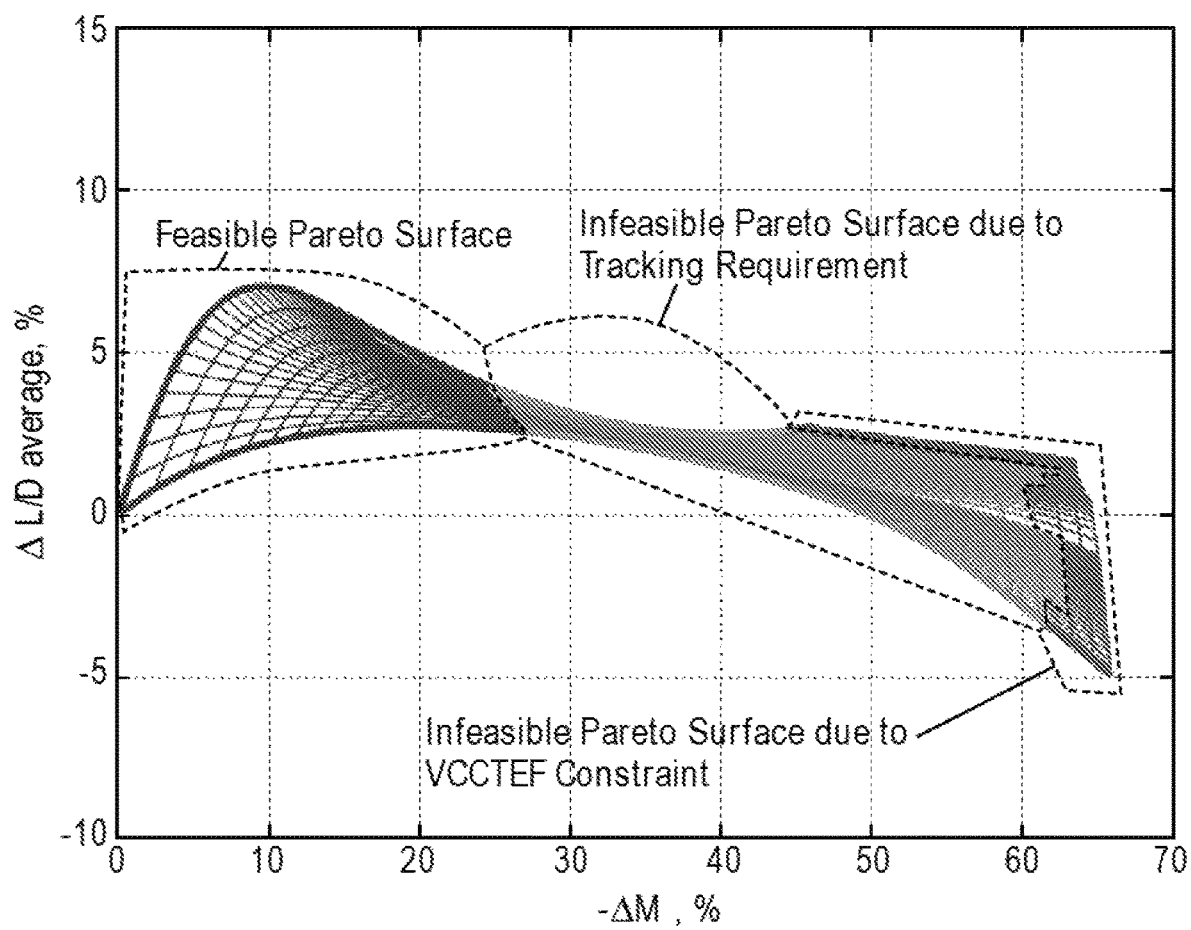
FIG. 15 is a graph illustrating the wing root bending moment Min response to multi-objective flight control system in accordance with an embodiment.

FIG. 15 is a graph of the wing root bending moment Min response to multi-objective flight control system 160 as compared to the response to a prior art flight control system in accordance with an embodiment. It can be clearly seen that multi-objective flight control system 160 is able to reduce the wing root bending moment significantly with both load alleviation objective 324 and drag minimization objective 328.

Figure 16:
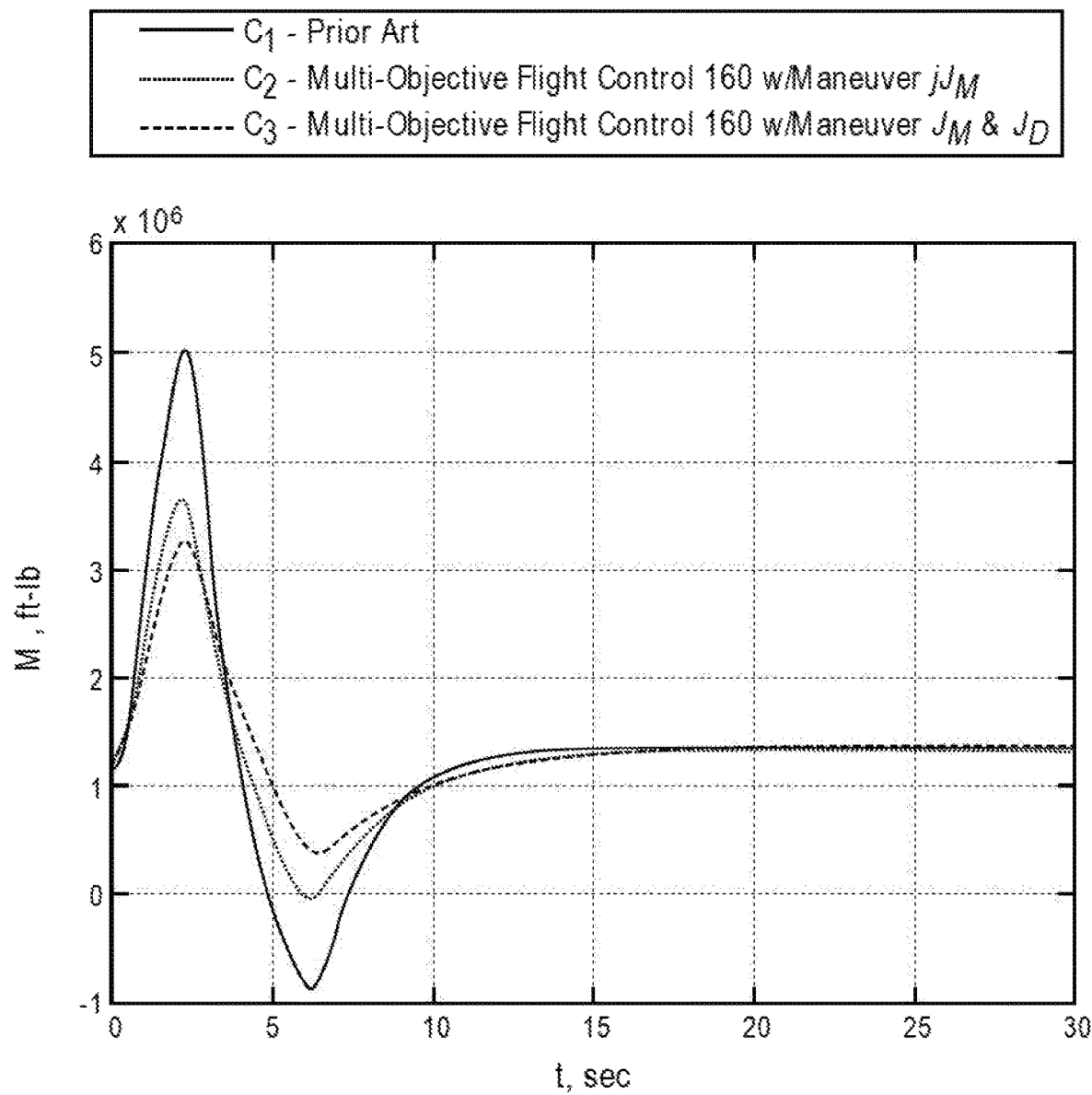
FIG. 16 is a graph illustrating the Pareto surface of the increase in the aerodynamic efficiency L/D in accordance with an embodiment of the invention.

To appreciate the interactions between drag minimization objective 328 and load alleviation objective 324, referring to FIG. 16 showing a graph of the Pareto surface of the increase in the aerodynamic efficiency L/D which is equivalent to drag reduction versus the reduction in the wing root bending moment for several combinations of the weighting coefficients $q_D$ and $q_M$ in accordance with an embodiment. Each point on the Pareto surface is represented by the drag minimization objective 328 and maneuver load alleviation objective 324. Without considering control design constraints such as relative deflections of flaps 132 of multi-functional flight control surface system 120 or the tracking error of pilot pitch rate command, multi-objective flight control system 160 could achieve up to about 65% reduction in the wing root bending moment and about 2% increase in the aerodynamic efficiency L/D. This is accomplished by prioritizing maneuver load alleviation objective 324 over drag minimization objective 328. In some flight operations, this prioritization is important such as during a roll maneuver.

At the other end, multi-objective flight control system 160 could achieve up to about 7% increase in the aerodynamic efficiency L/D and about 10% reduction in the wing root bending moment, as shown in FIG. 15. This is accomplished by prioritizing drag minimization objective 328 over maneuver load alleviation objective 324. In some flight operations, this prioritization is important such as during cruise operation.

Sensor-driven objective prioritization technique 310 addresses this automatic transition from one flight control objective to another without using a manual process such as a table lookup method.

Sensor-Driven Objective Prioritization

As flight conditions change, the desired priority of the individual flight control objectives in the cost function used by multi-objective flight control system 160 to compute flap operation instructions 166 may also change. This can be appreciated by FIG. 16 which explains the changes in the priority between drag minimization objective 328 and load alleviation objective 324. Sensor-driven objective prioritization module 310, as shown in FIG. 8, provides multi-objective flight control system 160 with the ability to change the priority of a flight control objective online using sensor data 164 in order to accommodate priority shifts. The weighting coefficient or matrix of a flight control objective in multi-objective flight control system 160 is made to adjust automatically depending on a particular flight operation as indicated by information provided by sensor data 164.

According to embodiments of the invention, sensor-driven objective prioritization module 310 modifies the multi-objective cost function in equation (45) as follows:

$$J = \lim_{t_f \to \infty} \frac{1}{2} \int_0^{t_f} \left[ (Fx - Gr)^\top Q(\|y\|)(Fx - Gr) + u^\top Ru + q_D(\|y\|)\Delta C_D + q_M(\|y\|)M^\top M + \sum_{i=4}^{N} J_i \right] dt \quad (61)$$

where y denotes an output of sensor data 164 and can be the state x in some embodiments.

Sensor-driven objective prioritization module 310 accommodates smooth movement throughout the design space of the weighting coefficient or matrix as the priority of the individual flight control objective changes. Sensor-driven objective prioritization module 310 also enables seamless transitions between different flight control objectives as might be the case when entering a new portion of the flight profile.

In one embodiment, the weighting coefficient or matrix for a given flight control objective is modified to increase the amplitude of the weighing coefficient as the signal amplitude from select sensor data 164 also increases. Without loss of generality, consider the weighting coefficient $q_M$ for load alleviation objective 324. During a gust encounter, the amplitude of the state information of aircraft 100 and aircraft wing 110 as indicated by sensor data 164 generally increases. Accordingly, the weighting coefficient $q_M$ for load alleviation objective 324 can be made to automatically adjust to a greater value according to the following equation:

$$q_M = q_{M_0} + (q_{M_1} - q_{M_0}) f(\|x\|) \quad (62)$$

where $f(\|x\|)$ is a positive-value function that is bounded between 0 and 1 and $q_{M_0}$ and $q_{M_1}$ are some positive constants that specify the bounds of the weighting coefficient $q_M$ such that $$q_{M_0} < q_M < q_{M_1} \quad (63)$$

Thus, the priority of load alleviation objective 324 can be automatically adjusted from a low priority mode with the weighting coefficient $q_M$ having a value close to $q_{M_0}$ to a high priority mode with the weighting coefficient $q_M$ having a value close to $q_{M_1}$.

A similar approach can be applied to the weighting coefficient $q_D$ for drag minimization objective 328 as:

$$q_D = q_{D_0} + \frac{(q_{D_1} - q_{D_0})f(\|x\|)}{\max f(\|x\|)} \quad (64)$$

For the purpose of illustration only, the weighting coefficient $q_M$ could be implemented with $$f(\|x\|) = \frac{|C\hat{x}|}{\max|Cx|} \quad (65)$$

where Cx is the estimated generalized displacement of the first aeroservoelastic mode which is expected to respond during a gust encounter and the maximum expected value of the generalized displacement is known. Using sensor-drive objective prioritization module 310, the weighting coefficient $q_M$ therefore is automatically adjusted as the magnitude of the generalized displacement of the first mode increases as will occur when aircraft 100 encounters a gust. The updated value of the weighting coefficient $q_M$ is then used by multi-objective flight control system 160 to synthesize the multi-objective flight control laws for flap operation instructions 166.

Figure 17:
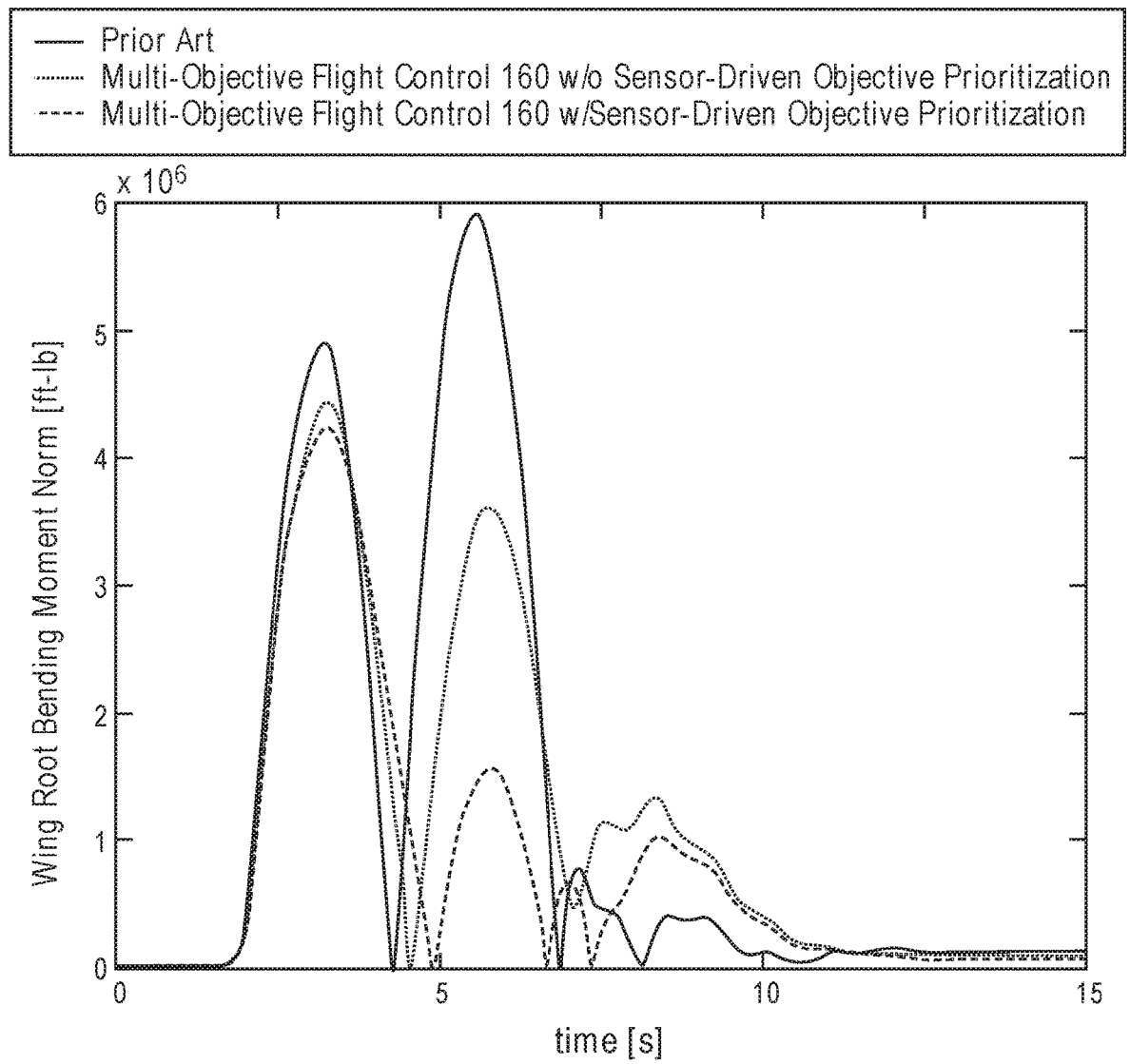
FIG. 17 is a graph illustrating the amplitude of the wing root bending moment response of an aircraft wing to illustrate an embodiment of the invention.

FIG. 17 is a graph of the amplitude of the wing root bending moment response of aircraft wing 110 in simulations during a gust encounter by sensor-driven objective prioritization module 310 in contrast with the wing root bending moment response without the aid of sensor-driven objective prioritization module 310 and with a standard prior art control It can be clearly seen that sensor-driven objective prioritization module 310 produces the largest reduction in the wing root bending moment.

In another embodiment of the invention, sensor-driven objective prioritization module 310 enables seamless transitions between different flight control objectives such as between drag minimization objective 328 and load alleviation objective 324. Accordingly, the weighting coefficient $q_D$ for drag minimization objective 328 and the weighting coefficient $q_M$ for load alleviation objective 324 can be made to automatically adjust in coordination according to the following equations:

$$q_D = q_{D_0}[1 - f(\|y\|)] \quad (66)$$

$$q_M = q_{M_0} f(\|y\|) \quad (67)$$

where $f(\|y\|)$ is chosen to prioritize load alleviation objective 324 when $f(\|y\|)$ is the largest value less than 1. One example of $f(\|y\|)$ could be $$f(\|y\|) = \frac{|x^\top M_x^\top M_x x|}{\max|M_x x|^2} \quad (68)$$

During a gust encounter, the structural load metric M, such as the wing root bending moment, is expected to increase in the amplitude. Measurements from sensor data 164 which may include strain gauges 150 thus provide early indications of an imminent gust encounter. Without the assistance of sensor-driven objective prioritization module 310, the weighting coefficient $q_D$ for drag minimization objective 328 is maintained at a pre-set value which can reduce the effectiveness of load alleviation objective as illustrated in FIG. 16. Therefore, sensor-driven objective prioritization module 310 attempts to increase the value of the weighting coefficient $q_M$ while decreasing the value of the weighting coefficient $q_D$ to prioritize load alleviation objective 324 over drag minimization objective 328.

Allowing the weighting coefficient or matrix to vary online in a bounded fashion also means that the control gain matrices $K_x$, $K_r$, and $K_w$ and the control trim input $\Lambda_0$ synthesized by multi-objective flight control system 160 also vary in time. The solution of the modified optimal control technique according to the present invention computed by multi-objective flight control system 160 requires solving the modified Ricatti equation online. The online solution of the Ricatti equation can present a computational burden as the dimension of the plant increases.

In another embodiment of the present invention, sensor-driven objective prioritization module 310 utilizes some forms of weighting coefficient or matrix that permit a closed-form expression for the solution of the modified Ricatti equation according to the present invention. For ease of illustration, consider a variant of the multi-objective cost function that includes sensor-driven objective prioritization technique 310 as follows:

$$J = \lim_{t_f \to \infty} \frac{1}{2} \int_0^{t_f} [x^\top Q(\|x\|)x + u^\top Ru + q_D \Delta C_D + q_M M^\top M] dt \quad (69)$$

where the weighting matrix $Q(\|x\|)$ has a form $$Q(\|x\|) = Q_0 + \frac{Q_1 \|x\|^2}{\max \|x\|^2} \quad (70)$$

$Q_0$ and $Q_1$ may be chosen to define the priority of aeroservoelastic mode suppression objective 322 over drag optimization objective 328 and load alleviation objective 324.

Multi-objective flight control system 160 then can synthesize multi-objective flight control laws similarly to equations (50)-(60) by replacing the solution W of the modified Ricatti equation by $$W(\|x\|) = W_0 + \frac{W_1 \|x\|^2}{\max \|x\|^2} \quad (71)$$

where $w_0$ and $W_1$ are solutions of the following modified Ricatti equations $$W_0 \overline{A} + \overline{A}^T W_0 - W_0 B \overline{R}^{-1} B W_0 + \overline{Q}_0 = 0 \quad (72)$$

$$W_1 A_C + A_c^\top W_1 - \frac{1}{\max \|x\|^2} W_1 BR^{-1} B^\top W_0 = 0 \quad (73)$$

$$A_c = A - BR^{-1} B^T W_0 \quad (74)$$

The weighting matrix $Q_1$ should be chosen to be positive such that $$Q_1 > \frac{1}{\max \|x\|^2} W_1 B\overline{R}^{-1} BW_1 \quad (75)$$

Other embodiments can be implemented for sensor-driven objective prioritization technique 310 with other forms of the function $f(|y|)$.

Runtime Scenario

Figure 18:
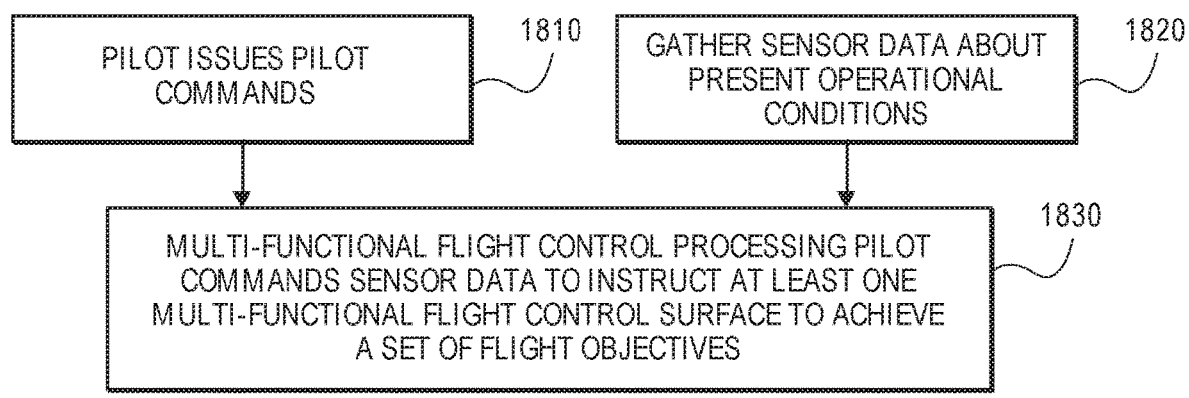
FIG. 18 is a flowchart illustrating the runtime operation of an embodiment of the invention.

FIG. 18 is an illustration of a runtime scenario for multi-objective flight control system 160 onboard aircraft 100 having aircraft wing 110 equipped with multi-functional flight control surface system 120 according to an embodiment. During operation, multi-objective flight control system 160 receives both pilot commands (step 1810) and sensor data about present operational conditions of aircraft 100. As shown in step 1830, the shape of each multi-functional flight control surface system 120 may be configured by multi-objective flight control system 160 to simultaneously adjust a trajectory of the aircraft in two or more of a pitch direction, a roll direction, and a yaw direction. Multi-objective flight control system 160 responds to both pilot commands received in step 1810 and machine-generated commands determined as a response to received sensor data in step 1820. The machine-generated commands produced by multi-objective flight control system configure the shape of the surface of each multi-functional flight control surface system 120 in real-time based, at least in part, upon a set of flight objectives comprising: (a) minimizing drag of the aircraft, (b) aeroelastic modal suppression for the aircraft, and (c) maneuver load alleviation in the aircraft.

To illustrate, aircraft 100 may enter a cruise phase during which fuel is burned off continuously. Aircraft 100 engages auto-pilot cruise control 304 which receives flap operation instructions 166 from a guidance law for cruise drag optimization objective 306. Aircraft 100 receives an air traffic command to climb to a new altitude. Multi-objective flight control system 160 computes and sends flap operation instructions 166 to flaps 132 of multi-functional flight control surface system 120 to perform multi-objective flight control that includes tracking pilot input command from a device such as a stick or a yoke, stability augmentation 326, aeroservoelastic mode suppression objective 322, and drag minimization objective 328 using sensor-driven objective prioritization technique 310 to prioritize it over load alleviation objective 324 according to equations (66) and (67). Aircraft 100 encounters a gust during the climb. Sensor data 164 which includes strain gauge 150 registers an increase in amplitude. Sensor-driven objective prioritization technique 310 begins to prioritize load alleviation objective 324 over drag minimization objective 328 to reduce structural load metrics such as the wing root bending moment. As aircraft 100 exits the gust field, sensor-driven objective prioritization technique 310 begins to increase the priority on drag minimization objective 328 to enable aircraft 100 to operate in a fuel economy mode.

Implementing Hardware

Figure 19:
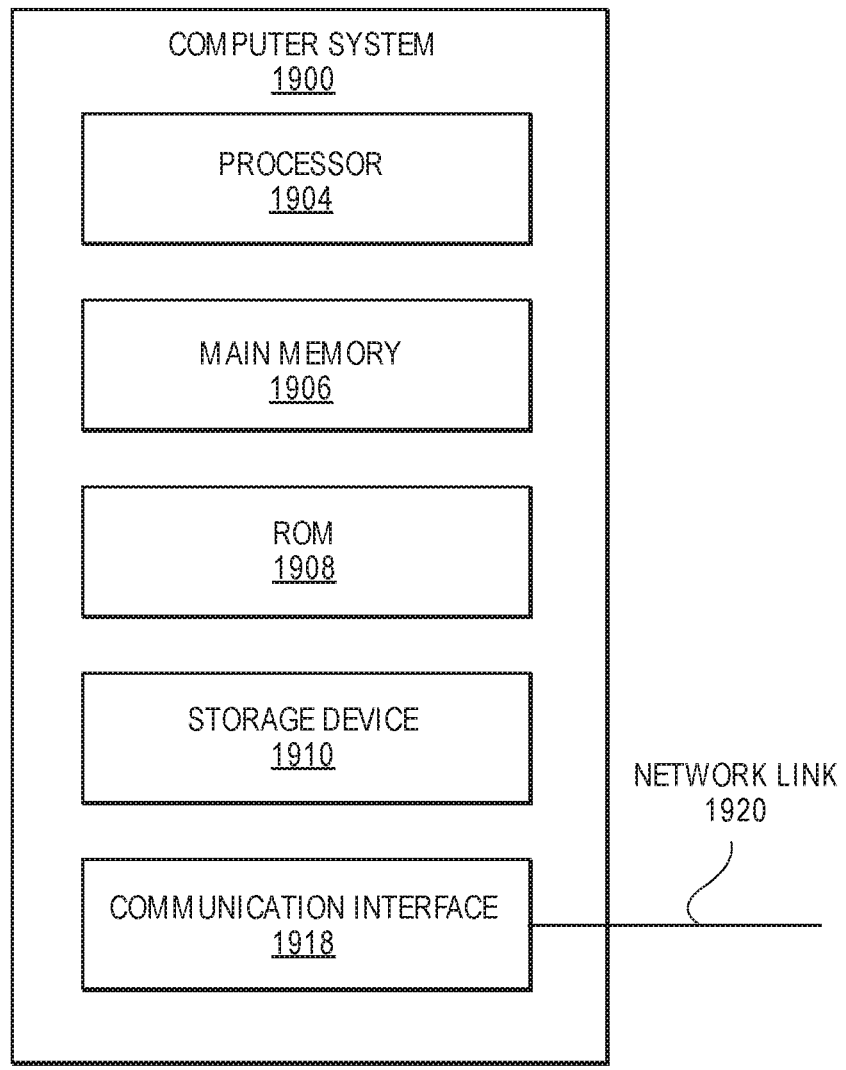
FIG. 19 is a block diagram that illustrates a computer system for executing a flight control according to an embodiment of the invention.

FIG. 19 is a block diagram that illustrates a computer system 1000 which may be used to implement, in whole or in part, one or more of control systems or modules used to support or implement each flight control objective in an embodiment of the invention. For example, each module shown in FIG. 8 may be implement by software that executes upon physical hardware, such as that depicted in FIG. 19.

In an embodiment, computer system 1900 includes one or more processors 1904, main memory 1906, ROM 1908, at least one storage device 1910, and a communication interface 1918. Computer system 1900 includes at least one processor 1004 for processing information. Computer system 1900 also includes a main memory 1906, such as a random-access memory (RAM) or other dynamic storage device, for storing information and instructions to be executed by a processor 1904. Main memory 1906 also may be used for storing temporary variables or other intermediate information during execution of instructions to be executed by processor 1904. Computer system 1900 further includes a read only memory (ROM) 1908 or other static storage device for storing static information and instructions for processor 1904. One or more storage devices 1910, such as a magnetic disk or optical disk, are provided for storing information and instructions.

Embodiments of the invention are related to the use of computer system 1900 for implementing the techniques described herein. According to one embodiment of the invention, those techniques are performed by computer system 1900 in response to processor 1904 executing one or more sequences of one or more instructions contained in main memory 1906. Such instructions may be read into main memory 1906 from another computer-readable medium, such as storage device 1910. Execution of the sequences of instructions contained in main memory 1906 causes processor 1904 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "non-transitory computer-readable storage medium" as used herein refers to any tangible medium that participates in storing instructions which may be provided to processor 1904 for execution. Non-limiting, illustrative examples of non-transitory computer-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other physical, tangible medium from which a computer can read.

Various forms of non-transitory computer-readable media may be involved in carrying one or more sequences of one or more instructions to processor 1904 for execution. For example, the instructions may initially be carried on a magnetic disk of a remote computer. The remote computer can load the instructions into its dynamic memory and send the instructions over a network link 1920 to computer system 1900.

Communication interface 1918 provides a two-way data communication coupling to a network link 1920 that is connected to a local network. For example, communication interface 1918 may be a local area network (LAN) card to provide a data communication connection to a compatible LAN. Wireless links or optical links may also be implemented. In any such implementation, communication interface 1918 sends and receives electrical, electromagnetic or optical signals that carry digital data streams representing various types of information.

Network link 1920 typically provides data communication through one or more networks to other data devices. For example, network link 1920 may provide a connection through a network to one or more other computer systems.

Computer system 1900 can send messages and receive data, including program code, through the network(s), network link 1920 and communication interface 1918. The received code may be executed by processor 1904 as it is received, and/or stored in storage device 1910, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A flight control system for instructing an aircraft, the aircraft comprising at least one multi-functional flight control surface, wherein said at least one multi-functional flight control surface comprises a sequence of flaps, wherein a shape of each surface, of said at least one multi-functional flight control surface, may be configured by the flight control to adjust a trajectory of the aircraft in two or more of a pitch direction, a roll direction, and a yaw direction, the flight control system comprising:
   one or more processors; and
   one or more non-transitory computer-readable storage mediums storing one or
      more sequences of instructions, which when executed by one or more processors, cause:
      the flight control system to operate said at least one multi-functional flight control surface, wherein said flight control system responds to both pilot commands and machine-generated commands, and wherein said machine-generated commands configure the shape of said each surface of said at least one multi-functional flight control surface in real-time based, at least in part, upon a set of flight objectives comprising: (a) minimizing drag of said aircraft, (b) aeroelastic modal suppression for said aircraft, and (c) maneuver load alleviation in said aircraft,
   wherein said flight control system adjusts the shape of said at least one multi-functional flight control surface to minimize the maneuver load upon the aircraft using a least-square adaptive control method.

2. The flight control system of claim 1, wherein said flight control system determines, in real-time, a set of multiple competing requirements for each of said set of flight objectives to determine how to instruct said at least one multi-functional flight control surface in a manner that possess the best compromise for said set of multiple competing requirements.

3. The flight control system of claim 1, wherein said flight control system specifies deflection commands for said at least one multi-functional flight control surface to change a lift distribution that results in a reduction in a wing root bending moment of an aircraft wing by shifting a lift distribution toward the inboard of the aircraft wing.

4. The flight control system of claim 1, wherein execution of the one or more sequences of instructions further cause the flight control system to:
   upon determining that the aircraft is experiencing a gust, prioritize the maneuver load alleviation flight objective over the drag minimization flight objective to reduce a structural load placed upon the aircraft.

5. The flight control of claim 1, wherein execution of the one or more sequences of instructions further cause the flight control system to:

upon determining that the aircraft is no longer experiencing a gust, increase a priority applied to the drag minimization flight objective, and decrease the priority applied to the maneuver load alleviation flight objective, to enable the aircraft to operate in a fuel economy mode.

6. The flight control system of claim 1, wherein said at least one multi-functional flight control surface comprises one or more accelerometers, and wherein said set of flight objectives further includes minimizing a gust load upon the aircraft.

7. The flight control system of claim 6, wherein said flight control system adjusts the shape of said at least one multi-functional flight control surface to minimize the gust load upon the aircraft by estimating the gust load upon the aircraft using measurements taken by said one or more accelerometers and a least-squares gradient.

8. A non-transitory computer readable storage medium storing one or more sequences of instructions for a flight control system for instructing an aircraft, the aircraft comprising: at least one multi-functional flight control surface, wherein said at least one multi-functional flight control surface comprises a sequence of flaps, wherein a shape of each surface, of said at least one multi-functional flight control surface, may be configured by a flight control to adjust a trajectory of the aircraft in two or more of a pitch direction, a roll direction, and a yaw direction, and wherein execution of the one or more sequences of instructions cause:

the flight control system to operate said at least one multi-functional flight control surface, wherein said flight control system responds to both pilot commands and machine-generated commands, and wherein said machine-generated commands configure the shape of said each surface of said at least one multi-functional flight control surface in real-time based, at least in part, upon a set of flight objectives comprising: (a) minimizing drag of said aircraft, (b) aeroelastic modal suppression for said aircraft, and (c) maneuver load alleviation in said aircraft, wherein said flight control system adjusts the shape of said at least one multi-functional flight control surface to minimize the maneuver load upon the aircraft using a least-square adaptive control method.

9. The non-transitory computer readable storage medium of claim 8, wherein said flight control system determines, in real-time, a set of multiple competing requirements for each of said set of flight objectives to determine how to instruct said at least one multi-functional flight control surface in a manner that possess the best compromise for said set of multiple competing requirements.

10. The non-transitory computer readable storage medium of claim 8, wherein said flight control system specifies deflection commands for said at least one multi-functional flight control surface to change a lift distribution that results in a reduction in a wing root bending moment of an aircraft wing by shifting a lift distribution toward the inboard of the aircraft wing.

11. The non-transitory computer readable storage medium of claim 8, wherein execution of the one or more sequences of instructions further cause:

upon determining that the aircraft is experiencing a gust, prioritizing the maneuver load alleviation flight objective over the drag minimization flight objective to reduce a structural load placed upon the aircraft.

12. The non-transitory computer readable storage medium of claim 8, wherein execution of the one or more sequences of instructions further cause:

upon determining that the aircraft is no longer experiencing a gust, increasing a priority applied to the drag minimization flight objective, and decreasing the priority applied to the maneuver load alleviation flight objective, to enable the aircraft to operate in a fuel economy mode.

13. The non-transitory computer readable storage medium of claim 8, wherein said at least one multi-functional flight control surface comprises one or more accelerometers, and wherein said set of flight objectives further includes minimizing a gust load upon the aircraft.

14. The non-transitory computer readable storage medium of claim 13, wherein said flight control system adjusts the shape of said at least one multi-functional flight control surface to minimize the gust load upon the aircraft by estimating the gust load upon the aircraft using measurements taken by said one or more accelerometers and a least-squares gradient.

15. A method for instructing an aircraft, the aircraft comprising at least one multi-functional flight control surface, wherein said at least one multi-functional flight control surface comprises a sequence of flaps, wherein a shape of each surface, of said at least one multi-functional flight control surface, may be configured by a flight control system to adjust a trajectory of the aircraft in two or more of a pitch direction, a roll direction, and a yaw direction, the method comprising the steps of:

the flight control system operating said at least one multi-functional flight control surface, wherein said flight control system responds to both pilot commands and machine-generated commands, and wherein said machine-generated commands configure the shape of said each surface of said at least one multi-functional flight control surface in real-time based, at least in part, upon a set of flight objectives comprising: (a) minimizing drag of said aircraft, (b) aeroelastic modal suppression for said aircraft, and (c) maneuver load alleviation in said aircraft, wherein said flight control system adjusts the shape of said at least one multi-functional flight control surface to minimize the maneuver load upon the aircraft using a least-square adaptive control method.

16. The method for instructing the aircraft of claim 15, wherein said flight control system determines, in real-time, a set of multiple competing requirements for each of said set of flight objectives to determine how to instruct said at least one multi-functional flight control surface in a manner that possess the best compromise for said set of multiple competing requirements.

17. The method for instructing the aircraft of claim 15, wherein said flight control system specifies deflection commands for said at least one multi-functional flight control surface to change a lift distribution that results in a reduction in a wing root bending moment of an aircraft wing by shifting a lift distribution toward the inboard of the aircraft wing.

18. The method for instructing the aircraft of claim 15, further comprising: upon determining that the aircraft is experiencing a gust, prioritizing the maneuver load alleviation flight objective over the drag minimization flight objective to reduce a structural load placed upon the aircraft.

* * * * *